United States Patent
Lee et al.

(10) Patent No.: US 12,473,366 B2
(45) Date of Patent: Nov. 18, 2025

(54) ANTI-TIE2 ANTIBODY AND USE THEREOF

(71) Applicant: PHARMABCINE INC., Daejeon (KR)

(72) Inventors: Eun-Ah Lee, Daejeon (KR); Beom Yong Park, Daejeon (KR); Nu Ri Kang, Daejeon (KR); Cheonho Park, Daejeon (KR); Youngae Lee, Daejeon (KR); Do-Yun Kim, Daejeon (KR); Weon Sup Lee, Daejeon (KR); Jin-San Yoo, Daejeon (KR)

(73) Assignee: PHARMABCINE INC., Daejeon (KR)

( * ) Notice: Subject to any disclaimer, the term of this patent is extended or adjusted under 35 U.S.C. 154(b) by 961 days.

(21) Appl. No.: 17/607,872

(22) PCT Filed: Aug. 14, 2020

(86) PCT No.: PCT/KR2020/010910
§ 371 (c)(1),
(2) Date: Oct. 30, 2021

(87) PCT Pub. No.: WO2021/029746
PCT Pub. Date: Feb. 18, 2021

(65) Prior Publication Data
US 2022/0213201 A1    Jul. 7, 2022

(30) Foreign Application Priority Data
Aug. 14, 2019    (KR) .................... 10-2019-0099491

(51) Int. Cl.
| C07K 16/28 | (2006.01) |
| A61K 39/395 | (2006.01) |
| A61K 45/06 | (2006.01) |
| A61P 27/02 | (2006.01) |
| A61P 35/00 | (2006.01) |
| A61K 39/00 | (2006.01) |

(52) U.S. Cl.
CPC ...... *C07K 16/2863* (2013.01); *A61K 39/3955* (2013.01); *A61K 45/06* (2013.01); *A61P 27/02* (2018.01); *A61P 35/00* (2018.01); *A61K 2039/505* (2013.01); *C07K 2317/33* (2013.01); *C07K 2317/565* (2013.01); *C07K 2317/76* (2013.01); *C07K 2317/92* (2013.01)

(58) Field of Classification Search
CPC ............ C07K 16/2863; C07K 2317/33; C07K 2317/565; C07K 2317/56
See application file for complete search history.

(56) References Cited

U.S. PATENT DOCUMENTS

2016/0222130 A1    8/2016    Kamohara et al.

FOREIGN PATENT DOCUMENTS

| CN | 112399975 A | 2/2021 |
| JP | 2011525104 A | 9/2011 |
| JP | 2012527234 A | 11/2012 |
| JP | 2014525934 A | 10/2014 |
| KR | 1020100125033 A | 11/2010 |
| KR | 1020140054303 A | 5/2014 |
| KR | 1020150014077 A | 2/2015 |
| RU | 2232812 C2 | 7/2004 |
| WO | 2016010014 A1 | 1/2016 |
| WO | 2019235856 A1 | 12/2019 |

OTHER PUBLICATIONS

Borghaei et al., Immunotherapy of cancer,2009 (Year: 2009).*
Meyskens et al., Cancer Prevention: Obstacles, Challenges, and the Road Ahead, 2016 (Year: 2016).*
Ahmad, S., et al., "Differential Expression of Angiopoietin-1 and Angiopoietin-2 in Colon Carcinoma", Cancer, 2001, pp. 1138-1143, vol. 92, Publisher: American Cancer Society.
Baronzio, G., et al., "Overview of methods for overcoming hindrance to drug delivery to tumors, with special attention to tumor interstitial fluid", Frontiers in Oncology, 2015, Page(s) doi:10.3389/fonc.2015.00165, vol. 5, No. 165.
Carmeliet, P., et al., "Angiogenesis in cancer and other diseases", Nature, 2000, pp. 249-257, vol. 407, Publisher: 2000 Macmillan Magazines Ltd.
Folkman, J., "Clinical Applications of Research On Angiogenesis", The New England Journal of Medicine, 1995, pp. 1757-1763, vol. 333, No. 26.
Hansbury, M., et al., "Production and characterization of a Tie2 agonist monoclonal antibody", Angiogenesis, 2001, pp. 29-36, vol. 4, Publisher: Kluwer Academic Publishers.
Huang, Y., et al., "Vascular Normalization as an Emerging Strategy to Enhance Cancer Immunotherapy", Cancer Research, 2013, pp. 2943-2948, vol. 73, Publisher: American Association for Cancer Research.
Koga, K., et al., "Expression of Angiopoietin-2 in Human Glioma Cells and Its Role for Angiogenesis", Cancer Research, 2001, pp. 6248-6254, vol. 61, Publisher: American Association for Cancer Research.

(Continued)

*Primary Examiner* — Nelson B Moseley, II
*Assistant Examiner* — Josephine K Darpolor
(74) *Attorney, Agent, or Firm* — HULTQUIST, PLLC; Steven J. Hultquist

(57) ABSTRACT

The present invention relates to an antibody, which specifically binds to tyrosine-protein kinase receptor TIE-2 (TIE2) so as to possess functions of blood vessel normalization and stabilization through receptor phosphorylation, and relates to: an anti-TIE2 antibody; a nucleic acid encoding same; a vector comprising the nucleic acid; a cell transformed with the vector; a method for preparing the antibody; an agent for stabilizing blood vessels and a composition for treating angiogenesis-associated diseases, both of which comprise the antibody; and a composition for co-administration with a pharmaceutical composition for tumor or cancer treatment and with a composition other than an antibody binding to TIE2.

15 Claims, 15 Drawing Sheets

Specification includes a Sequence Listing.

(56) References Cited

OTHER PUBLICATIONS

Metheny-Barlow, L.J., et al., "The enigmatic rold of angiopoietin-1 in tumor angoigenesis", Cell Research, 2003, pp. 309-317, vol. 13, No. 5, Publisher: http://www.cell-research.com.
Risau, W., "Mechanisms of angiogenesis", Nature, 1997, pp. 671-674, vol. 386.
Suri, C., et al., "Requisite Role of Angiopoietin-1, a Ligand for the TIE2 Receptor, during Embryonic Angiogenesis", Cell, 1996, pp. 1171-1180, vol. 87, Publisher: Cell Press.
Hwang, B., et al., "Stimulation of angiogenesis and survival of endothelial cells by human momoclonal Tie2 receptor antibody", Biomaterials, 2015, pp. 119-128, vol. 51, Publisher: Elsevier.
Kuznetsova, E., "Brackets in Text of Legal Document as a Linguistic and Cognitive Phenomenon", Institute of Humanities, Lomonosov Northern Federal University, 2015, Pages ISSN 2072-8522, vol. 3.
Mariuzza, R. A., et al., "The Structural Basis of Antigen-Antibody Recognition", Ann. Rev. Biophys. Chem., 1987, pp. 139-159, vol. 16.
Office Action Issued on Aug. 15, 2022 in counterpart Russian Patent Application No. 2021130448, Aug. 15, 2022.
English Translation of Office Action Issued on Aug. 15, 2022 in counterpart Russian Patent Application No. 2021130448, Aug. 15, 2022.
Search Report Issued on Aug. 15, 2022 in counterpart Russian Patent Application No. 2021130448, Aug. 15, 2022.
Muller, S., et al., "Spliceosomal Peptide P140 for Immunotherapy of Systemic Lupus Erythematosus", Arthritis & Rheumatism, vol. 58, No. 12, Dec. 2008, pp. 3873-3883, American College of Rheumatology.
Office Action Issued in CN202080042038.9 on Nov. 4, 2023.
English Translation of Office Action issued on Nov. 4, 2023 in CN202080042038.9.
Search Report Issued in CN202080042038.9 on Nov. 4, 2023.
Henricks, L.M., et al., "The use of combinations of monoclonal antibodies in clinical oncology", Cancer Treatment Reviews, 2015, http://dx.doi.org/10.1016/j.ctrv.2015.10.008, Publisher: Elsevier.
English Translation of Office Action issued on Jan. 16, 2023 for Counterpart JP Patent Application No. 2021-561640.
Office Action issued on Jan. 16, 2023 for Counterpart JP Patent Application No. 2021-561640.
Office Action issued on Dec. 22, 2022 in Counterpart Russian Patent Application No. 2021130448.
English Translation of Office Action issued on Dec. 22, 2022 in Counterpart Russian Patent Application No. 2021130448.
Yoo, S.Y., et al., "Angiogenesis and Its Therapeutic Opportunities", Mediators of Inflammation, 2013, Art. ID 127170; http://dx.doi.org/10.1155/2013/127170, vol. 2013, Publisher: Hindawi Publishing Corporation.

* cited by examiner

[Fig. 1a]
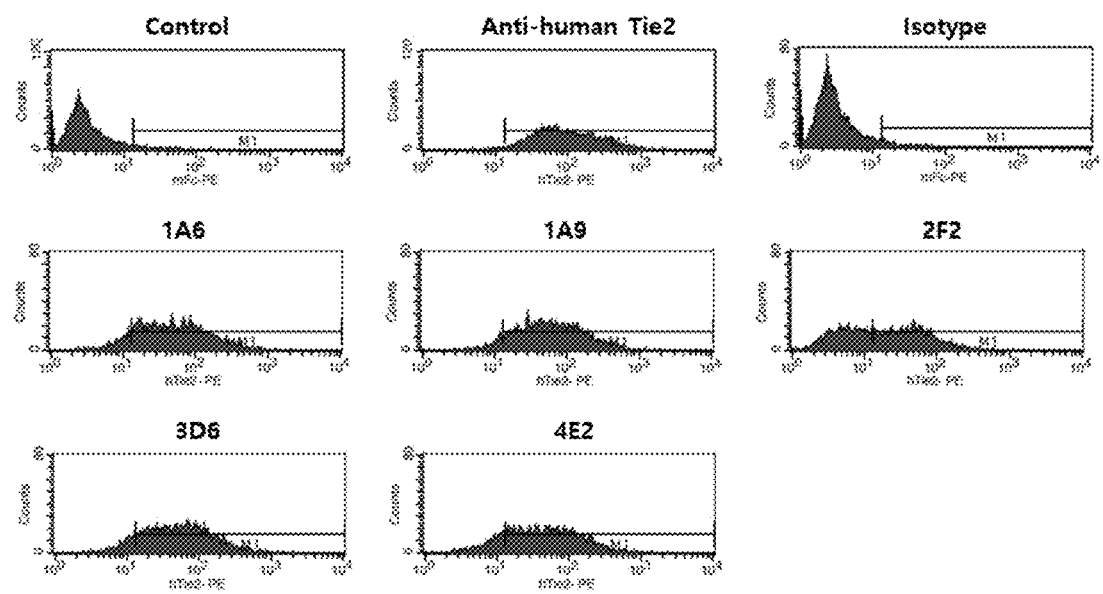
[Fig. 1b]
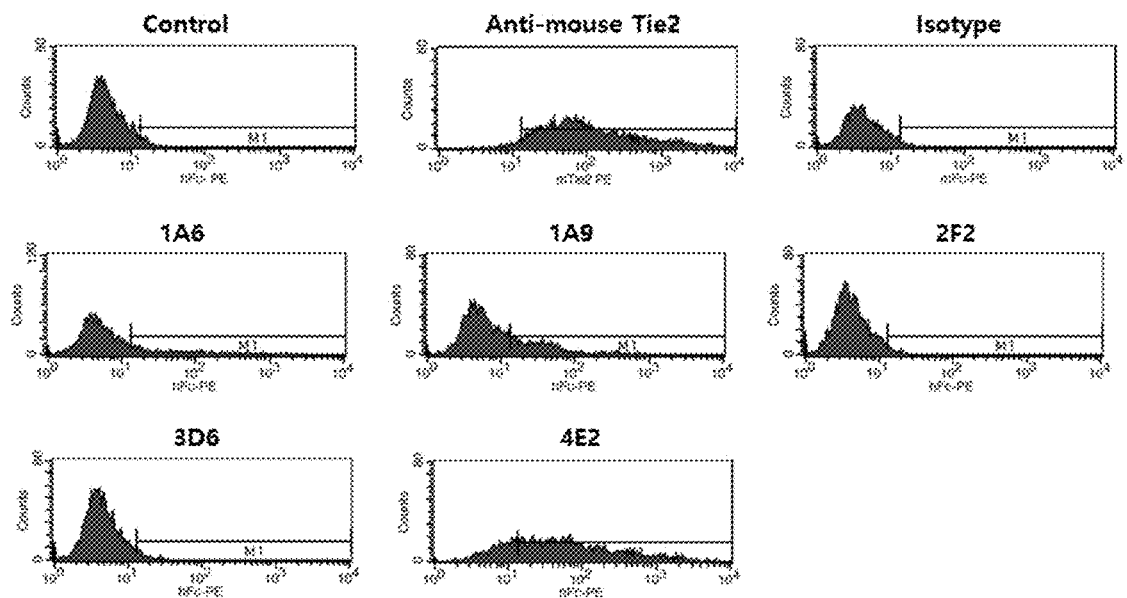

[Fig. 2]
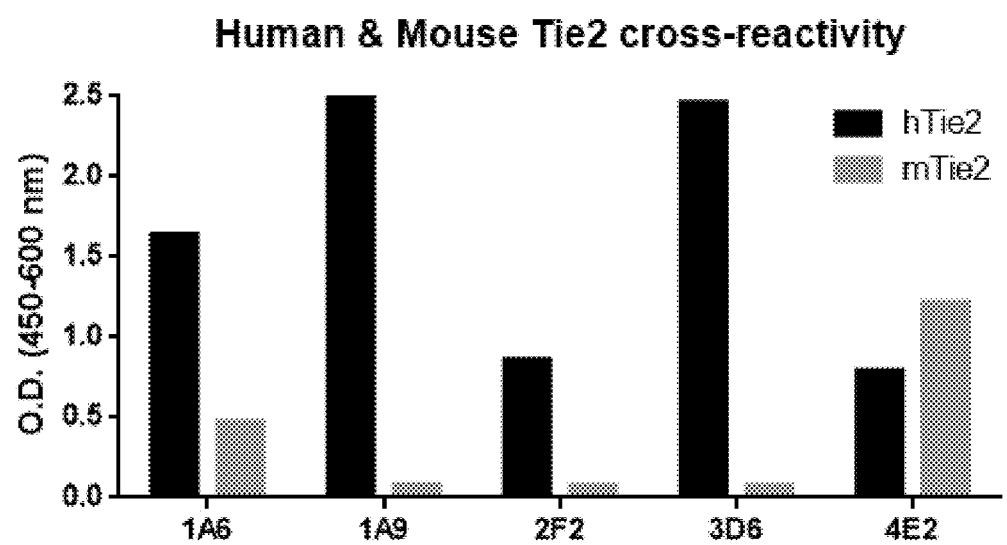

[Fig. 3a]
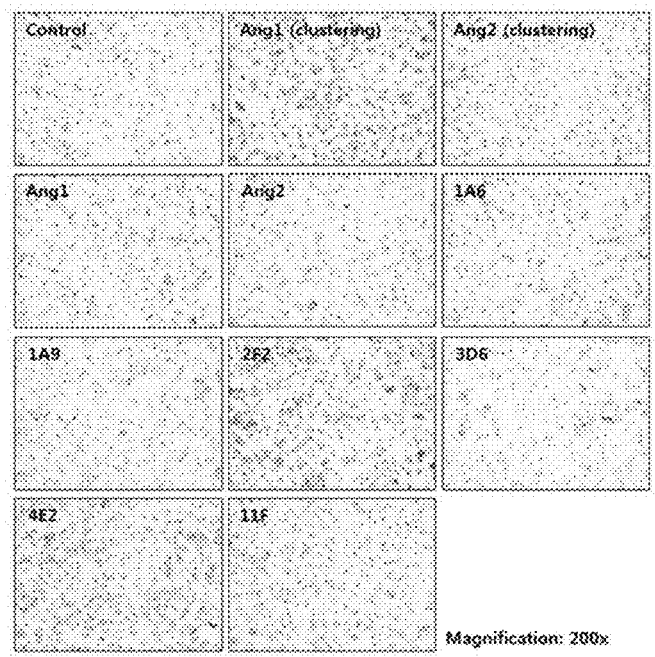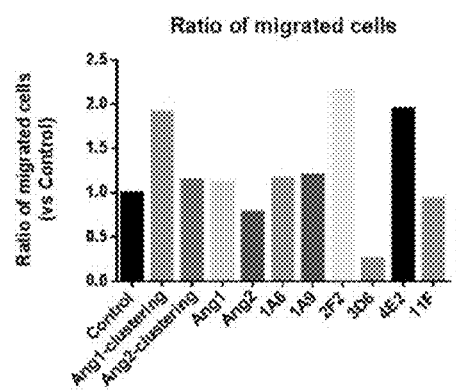

[Fig. 3b]
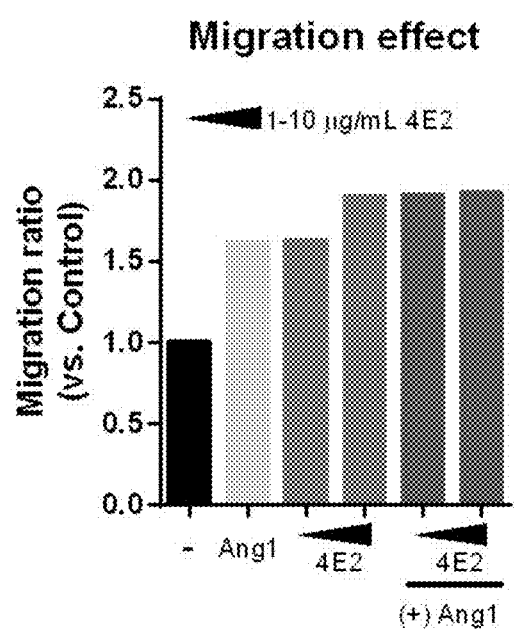
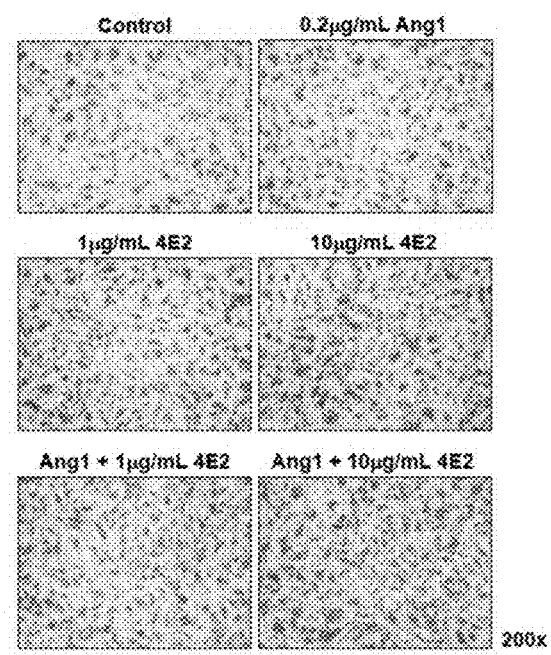
[Fig. 3c]
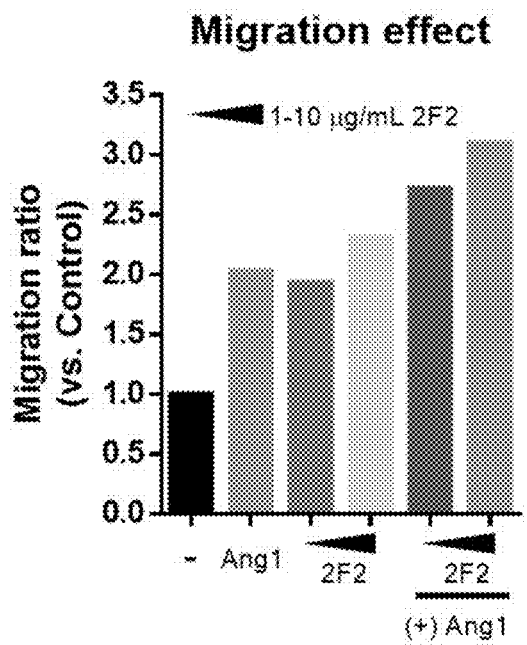
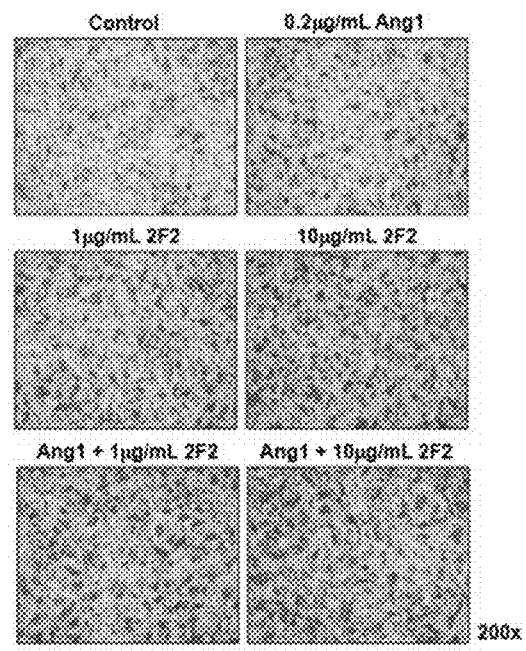

[Fig. 4]
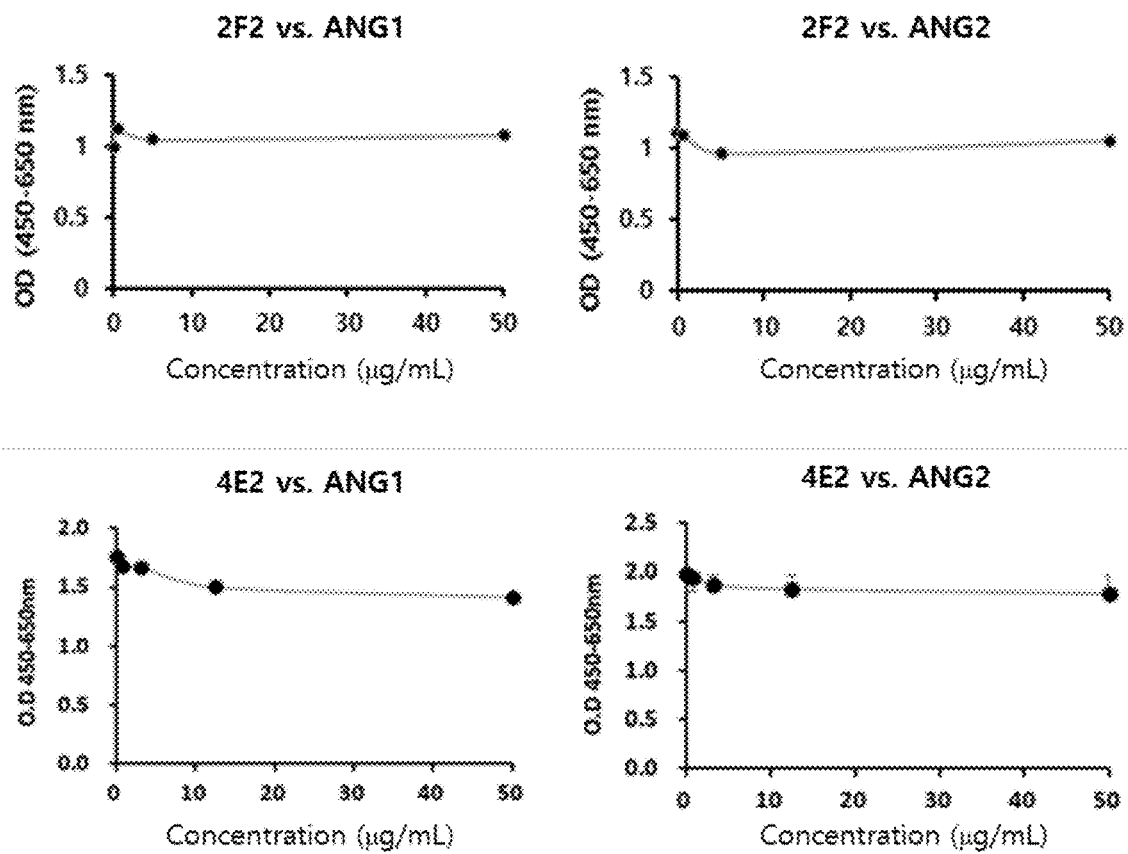

【Fig. 5a】
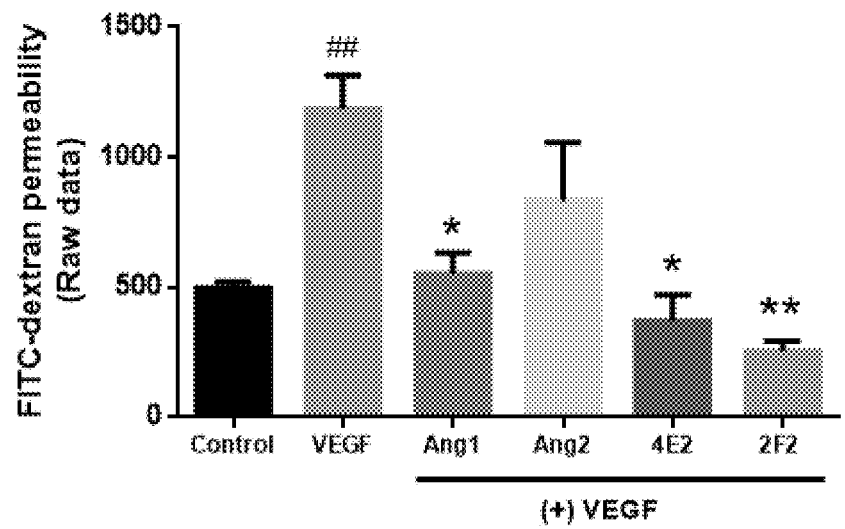
【Fig. 5b】
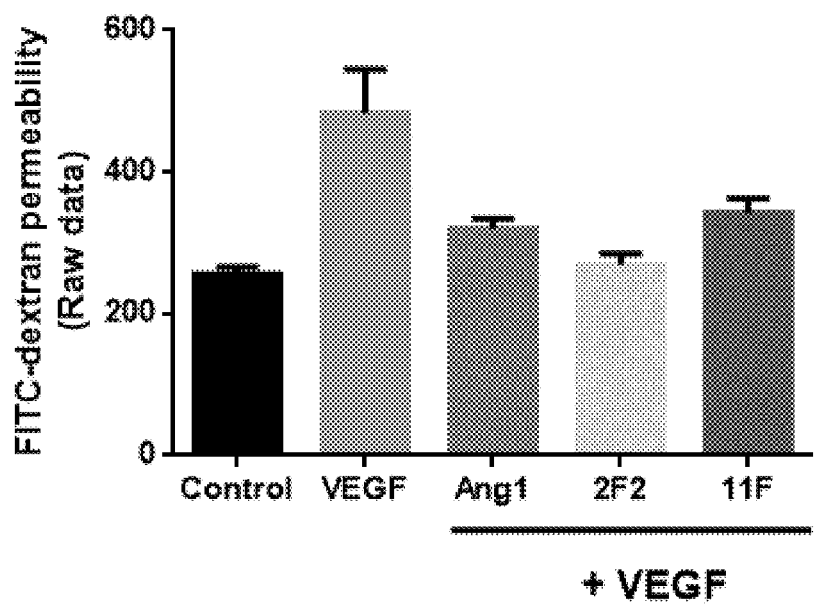

[Fig. 5c]
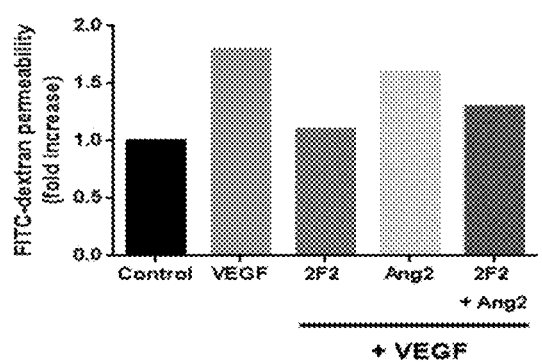
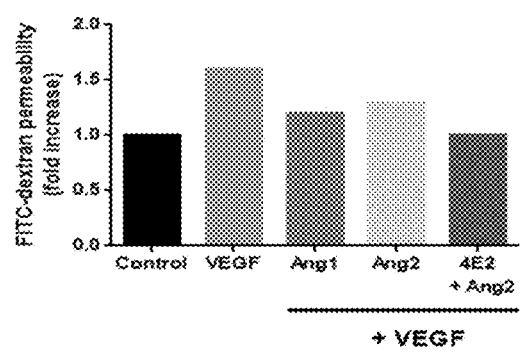

[Fig. 6]
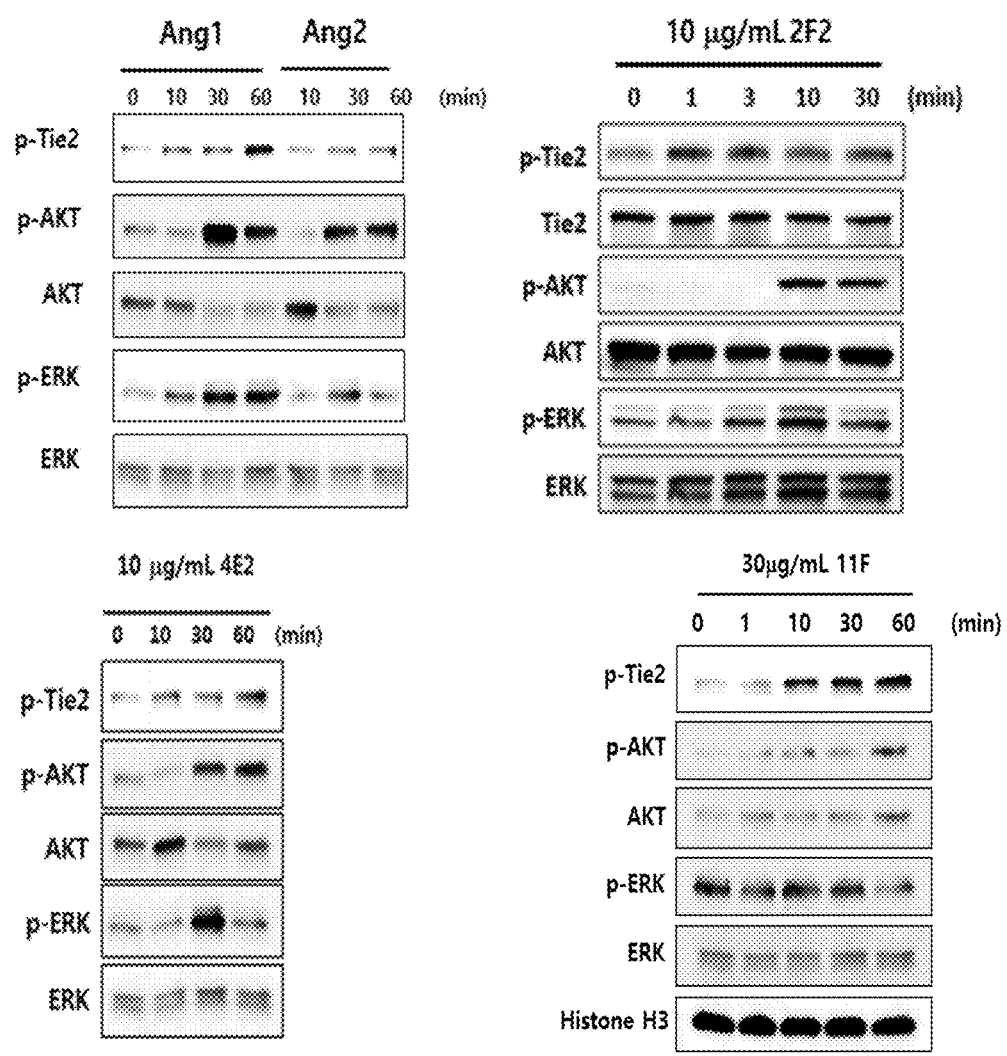

[Fig. 7]
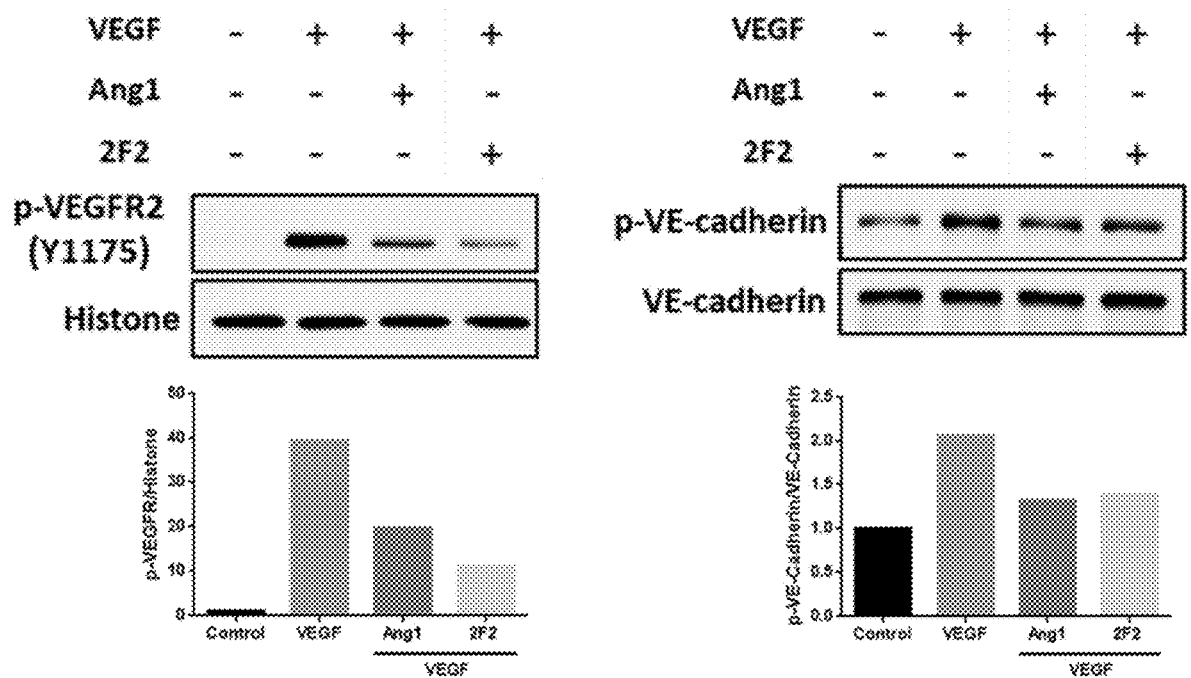

【Fig. 8a】
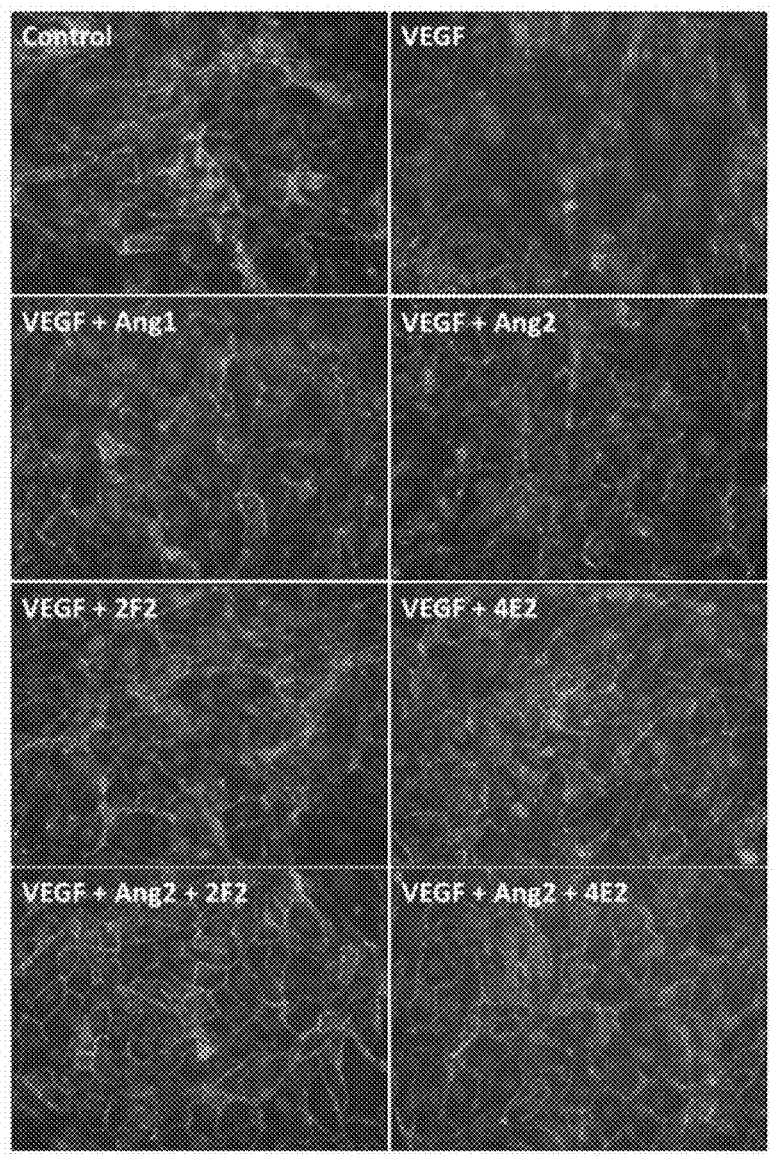
【Fig. 8b】
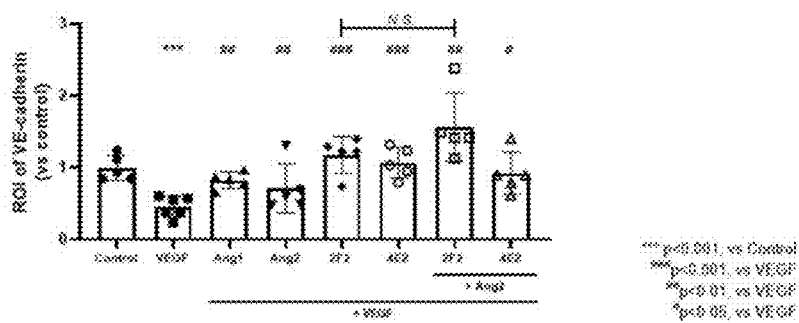

[Fig. 9]
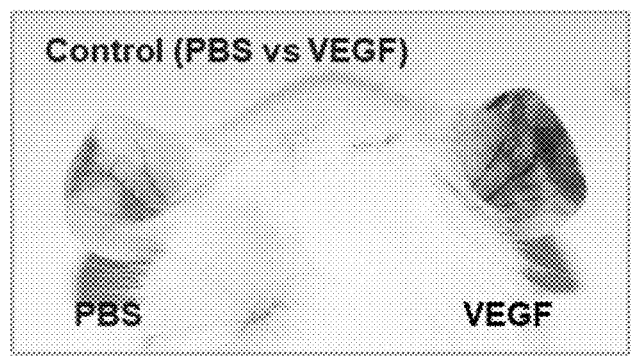
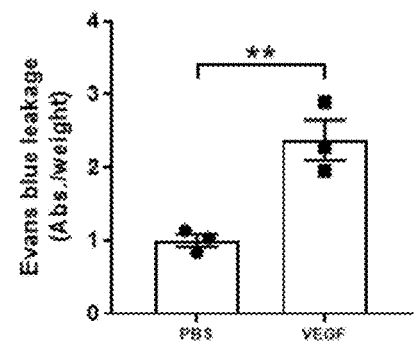
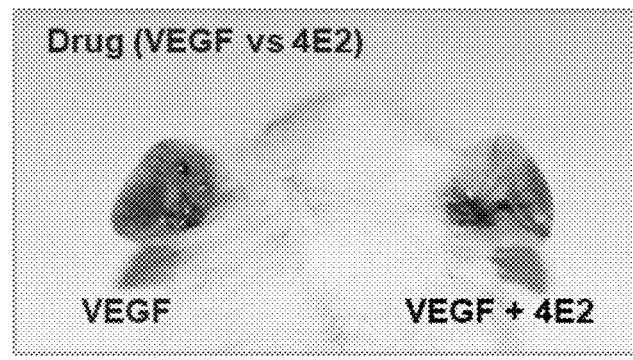
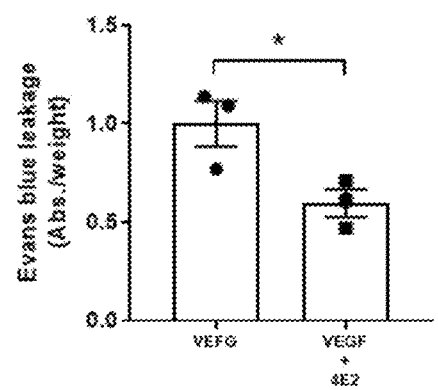

[Fig. 10a]
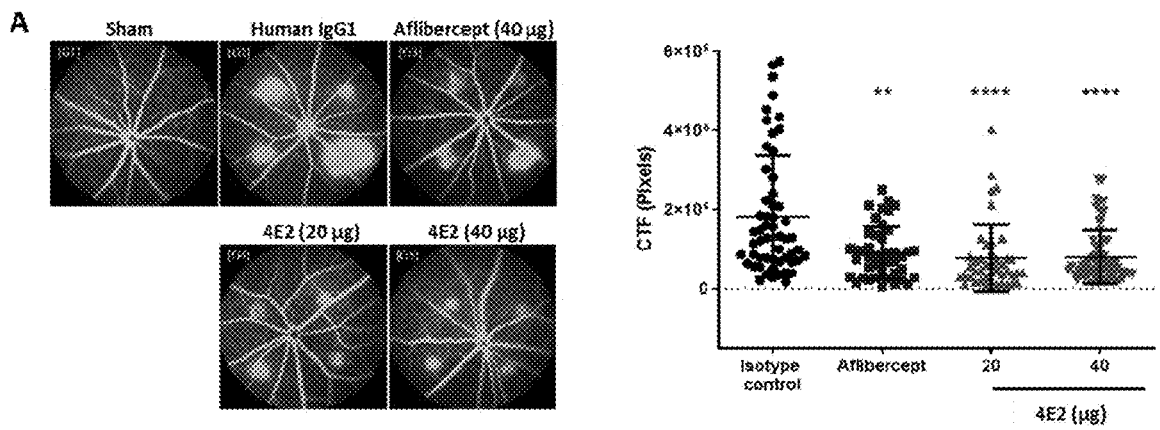
[Fig. 10b]
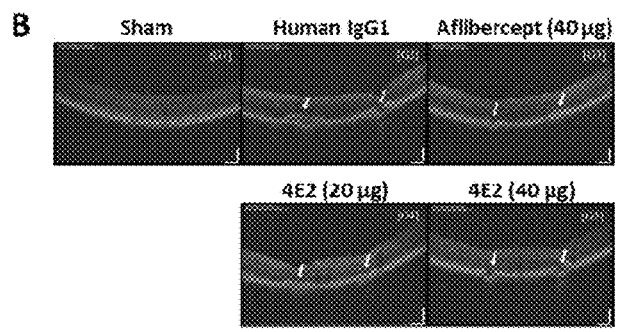
[Fig. 10c]
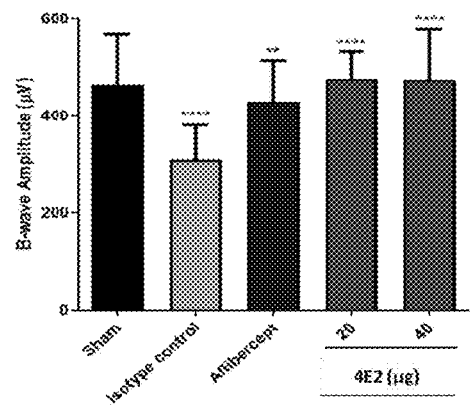
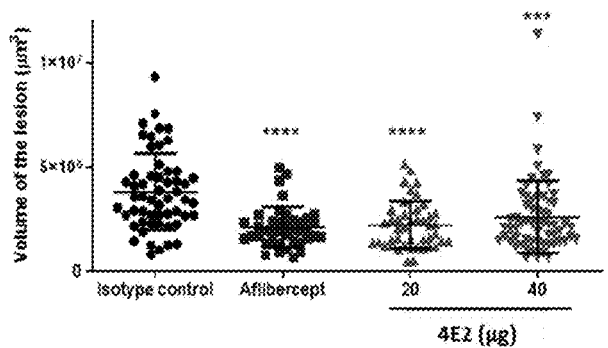

[Fig. 11a]
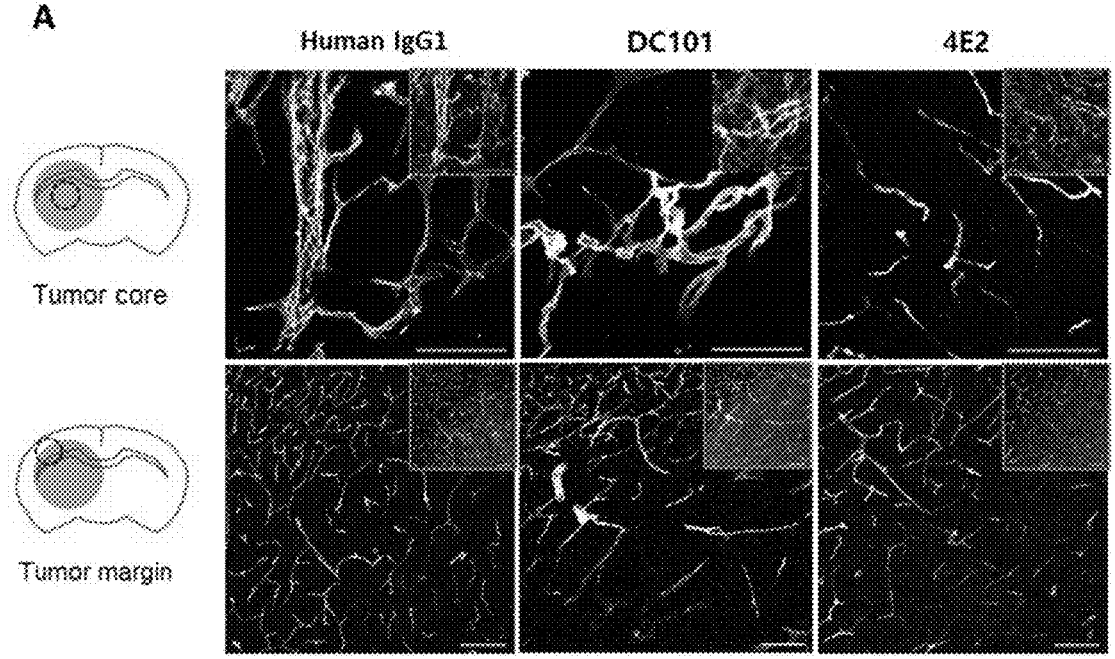
[Fig. 11b]
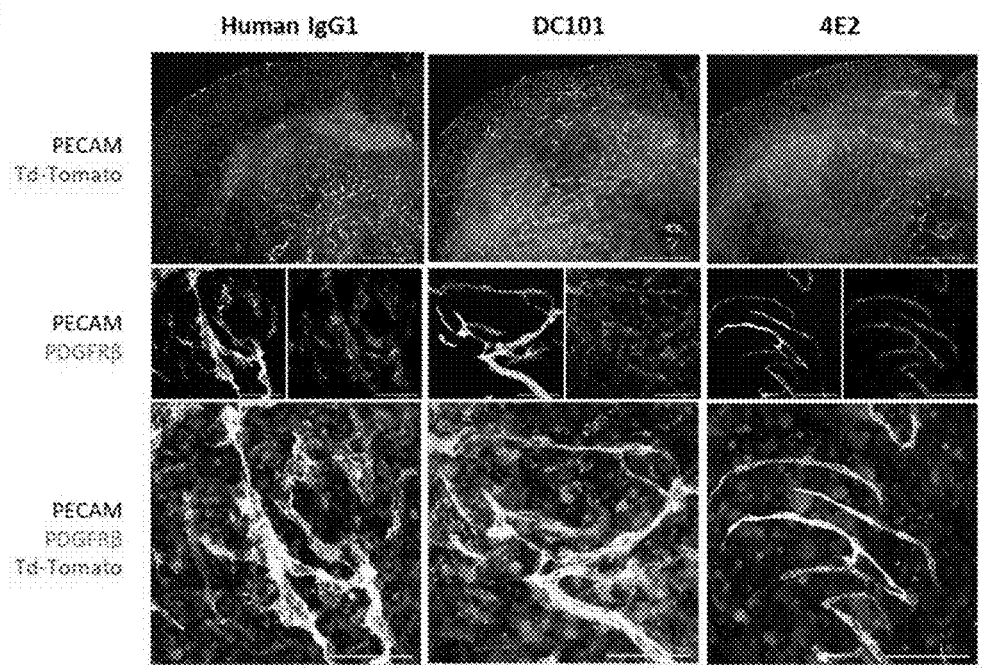

[Fig. 12a]
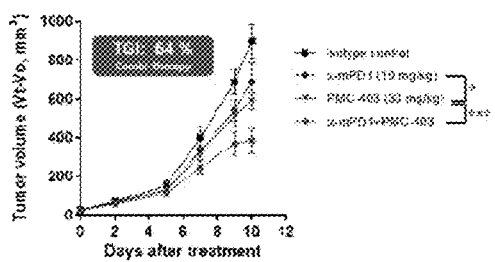
[Fig. 12b]
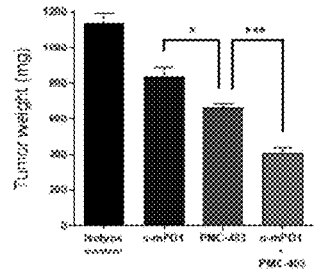
[Fig. 12c]
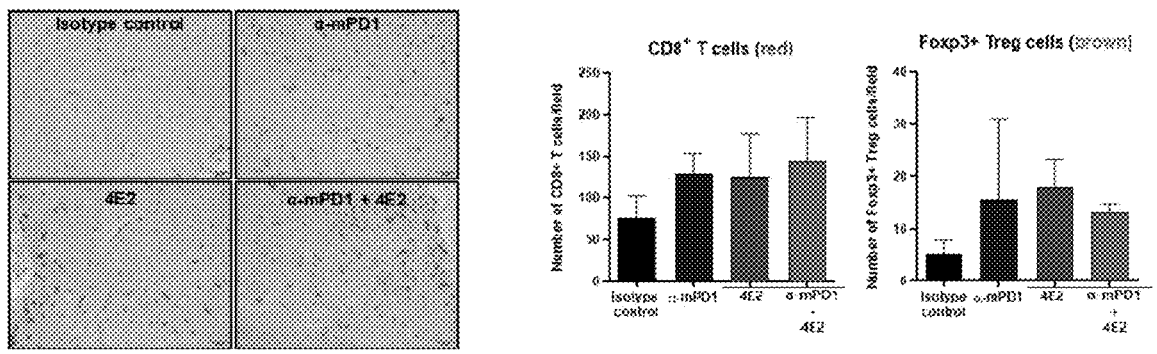
[Fig. 12d]
❖ T cells
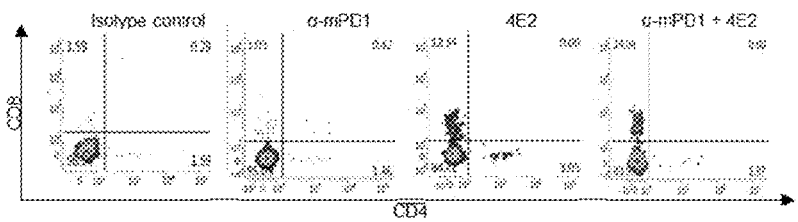
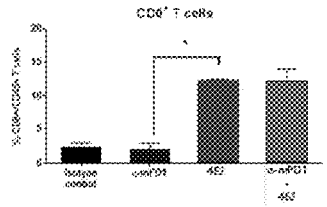
❖ MDSC cells
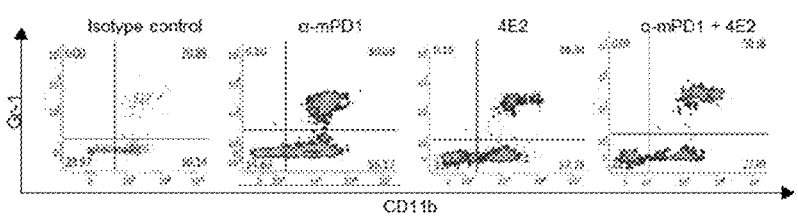
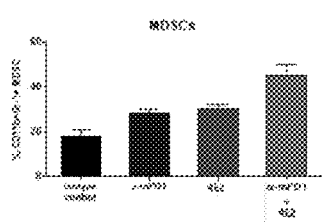

[Fig. 13a]
A
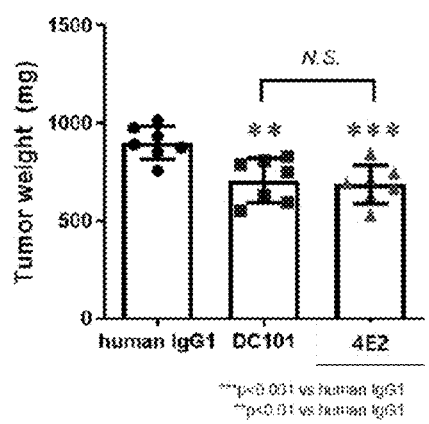
[Fig. 13b]
B
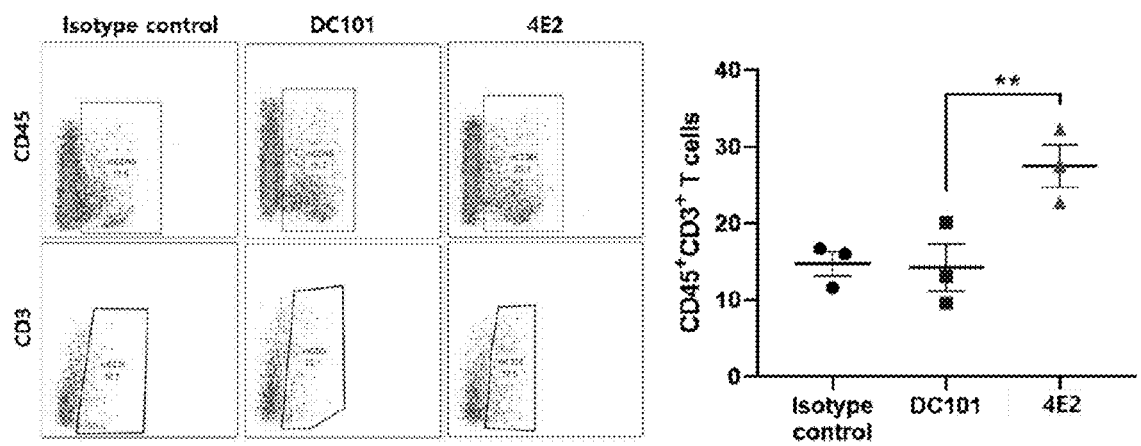
[Fig. 13c]
C
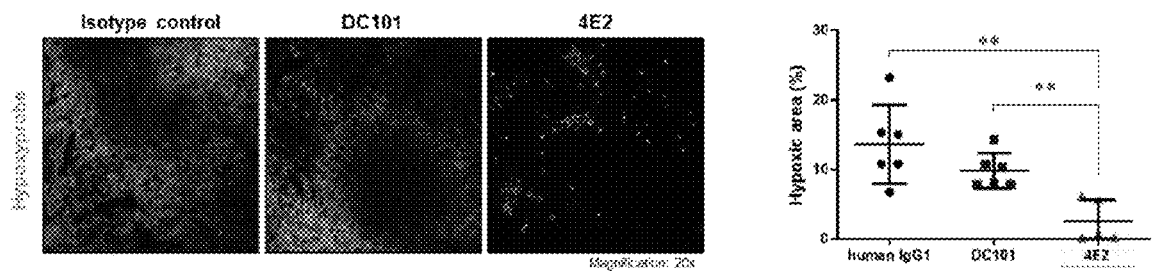

```
                        SEQUENCE LISTING

<160> NUMBER OF SEQ ID NOS: 60

<210> SEQ ID NO 1
<211> LENGTH: 8
<212> TYPE: PRT
<213> ORGANISM: Artificial Sequence
<220> FEATURE:
<223> OTHER INFORMATION: Heavy-chain CDR1

<400> SEQUENCE: 1

Gly Phe Thr Phe Ser Ser Tyr Ala
1               5

<210> SEQ ID NO 2
<211> LENGTH: 8
<212> TYPE: PRT
<213> ORGANISM: Artificial Sequence
<220> FEATURE:
<223> OTHER INFORMATION: Heavy-chain CDR2

<400> SEQUENCE: 2

Ile Ser Gly Ser Gly Gly Ser Thr
1               5

<210> SEQ ID NO 3
<211> LENGTH: 14
<212> TYPE: PRT
<213> ORGANISM: Artificial Sequence
<220> FEATURE:
<223> OTHER INFORMATION: Heavy-chain CDR3

<400> SEQUENCE: 3

Ala Arg Gly Val Asp Ser Ser Met Val Thr Gly Phe Asp His
1               5                   10

<210> SEQ ID NO 4
<211> LENGTH: 6
<212> TYPE: PRT
<213> ORGANISM: Artificial Sequence
<220> FEATURE:
```

<223> OTHER INFORMATION: Light-chain CDR1

<400> SEQUENCE: 4

Gln Ser Ile Ser Arg Trp
1               5

<210> SEQ ID NO 5
<211> LENGTH: 3
<212> TYPE: PRT
<213> ORGANISM: Artificial Sequence
<220> FEATURE:
<223> OTHER INFORMATION: Light-chain CDR2

<400> SEQUENCE: 5

Glu Ala Ser
1

<210> SEQ ID NO 6
<211> LENGTH: 9
<212> TYPE: PRT
<213> ORGANISM: Artificial Sequence
<220> FEATURE:
<223> OTHER INFORMATION: Light-chain CDR3

<400> SEQUENCE: 6

Gln Gln Tyr Glu Asp Tyr Pro Leu Thr
1               5

<210> SEQ ID NO 7
<211> LENGTH: 8
<212> TYPE: PRT
<213> ORGANISM: Artificial Sequence
<220> FEATURE:
<223> OTHER INFORMATION: Heavy-chain CDR1

<400> SEQUENCE: 7

Gly Tyr Thr Phe Asn Ser Tyr Asp
1               5

<210> SEQ ID NO 8
<211> LENGTH: 10
<212> TYPE: PRT
<213> ORGANISM: Artificial Sequence
<220> FEATURE:
<223> OTHER INFORMATION: Heavy-chain CDR2

<400> SEQUENCE: 8

Val Asn Pro Pro Gly Gly Thr Gly Ser Thr
1               5                   10

<210> SEQ ID NO 9
<211> LENGTH: 13
<212> TYPE: PRT
<213> ORGANISM: Artificial Sequence
<220> FEATURE:
<223> OTHER INFORMATION: Heavy-chain CDR3

<400> SEQUENCE: 9

Ala Arg Asp Tyr Asn Arg Ala Pro Pro Thr Leu Asp Val
1               5                   10

<210> SEQ ID NO 10
<211> LENGTH: 10
<212> TYPE: PRT
<213> ORGANISM: Artificial Sequence
<220> FEATURE:
<223> OTHER INFORMATION: Light-chain CDR1

<400> SEQUENCE: 10

Ser Ser Ser Asp Val Gly Gly Tyr Asn Tyr
1               5                   10

<210> SEQ ID NO 11
<211> LENGTH: 3
<212> TYPE: PRT
<213> ORGANISM: Artificial Sequence
<220> FEATURE:
<223> OTHER INFORMATION: Light-chain CDR2

<400> SEQUENCE: 11

Asp Val Thr
1

<210> SEQ ID NO 12
<211> LENGTH: 10
<212> TYPE: PRT
<213> ORGANISM: Artificial Sequence
<220> FEATURE:
<223> OTHER INFORMATION: Light-chain CDR3

<400> SEQUENCE: 12

Ser Ser Tyr Ser Ser Ser Thr Phe Tyr Val
1               5                   10

<210> SEQ ID NO 13
<211> LENGTH: 8
<212> TYPE: PRT
<213> ORGANISM: Artificial Sequence
<220> FEATURE:
<223> OTHER INFORMATION: Heavy-chain CDR1

<400> SEQUENCE: 13

Gly Phe Thr Phe Ser Ser Tyr Ala
1               5

<210> SEQ ID NO 14
<211> LENGTH: 8
<212> TYPE: PRT
<213> ORGANISM: Artificial Sequence
<220> FEATURE:
<223> OTHER INFORMATION: Heavy-chain CDR2

<400> SEQUENCE: 14

Ile Ser Gly Ser Gly Gly Ser Thr
1               5

<210> SEQ ID NO 15
<211> LENGTH: 11
<212> TYPE: PRT
<213> ORGANISM: Artificial Sequence
<220> FEATURE:
<223> OTHER INFORMATION: Heavy-chain CDR3

<400> SEQUENCE: 15

Ala Arg Gly Gly Leu His His Gly Phe Asp Ile
1               5                   10

<210> SEQ ID NO 16
<211> LENGTH: 6
<212> TYPE: PRT
<213> ORGANISM: Artificial Sequence
<220> FEATURE:
<223> OTHER INFORMATION: Light-chain CDR1

```
<400> SEQUENCE: 16

Asn Ile Glu Ser Lys Ser
1               5

<210> SEQ ID NO 17
<211> LENGTH: 3
<212> TYPE: PRT
<213> ORGANISM: Artificial Sequence
<220> FEATURE:
<223> OTHER INFORMATION: Light-chain CDR2

<400> SEQUENCE: 17

Tyr Asp Asn
1

<210> SEQ ID NO 18
<211> LENGTH: 11
<212> TYPE: PRT
<213> ORGANISM: Artificial Sequence
<220> FEATURE:
<223> OTHER INFORMATION: Light-chain CDR3

<400> SEQUENCE: 18

Gln Val Trp Asp Thr Tyr Thr Asp Gln Pro Val
1               5                   10

<210> SEQ ID NO 19
<211> LENGTH: 8
<212> TYPE: PRT
<213> ORGANISM: Artificial Sequence
<220> FEATURE:
<223> OTHER INFORMATION: Heavy-chain CDR1

<400> SEQUENCE: 19

Gly Phe Thr Phe Ser Arg Tyr Asn
1               5

<210> SEQ ID NO 20
<211> LENGTH: 8
<212> TYPE: PRT
<213> ORGANISM: Artificial Sequence
<220> FEATURE:
<223> OTHER INFORMATION: Heavy-chain CDR2

<400> SEQUENCE: 20

Ile Ser Ser Ser Gly Arg Phe Ile
1               5

<210> SEQ ID NO 21
<211> LENGTH: 17
<212> TYPE: PRT
<213> ORGANISM: Artificial Sequence
<220> FEATURE:
<223> OTHER INFORMATION: Heavy-chain CDR3

<400> SEQUENCE: 21

Ala Arg Asp Ser Pro Thr Gln Gly Pro Tyr Tyr Tyr Gly Met Asp
1               5                   10                  15

Val

<210> SEQ ID NO 22
<211> LENGTH: 6
<212> TYPE: PRT
<213> ORGANISM: Artificial Sequence
<220> FEATURE:
<223> OTHER INFORMATION: Light-chain CDR1
```

```
<400> SEQUENCE: 22

Lys Ile Gly Ser Lys Ser
1               5

<210> SEQ ID NO 23
<211> LENGTH: 3
<212> TYPE: PRT
<213> ORGANISM: Artificial Sequence
<220> FEATURE:
<223> OTHER INFORMATION: Light-chain CDR2

<400> SEQUENCE: 23

Tyr Asp Ser
1

<210> SEQ ID NO 24
<211> LENGTH: 11
<212> TYPE: PRT
<213> ORGANISM: Artificial Sequence
<220> FEATURE:
<223> OTHER INFORMATION: Light-chain CDR3

<400> SEQUENCE: 24

Gln Val Trp Asp Ser Ser Ser Asp Arg Pro Val
1               5                   10

<210> SEQ ID NO 25
<211> LENGTH: 8
<212> TYPE: PRT
<213> ORGANISM: Artificial Sequence
<220> FEATURE:
<223> OTHER INFORMATION: Heavy-chain CDR1

<400> SEQUENCE: 25

Gly Phe Thr Phe Ser Asp Tyr Ala
1               5

<210> SEQ ID NO 26
<211> LENGTH: 8
<212> TYPE: PRT
<213> ORGANISM: Artificial Sequence
<220> FEATURE:
<223> OTHER INFORMATION: Heavy-chain CDR2

<400> SEQUENCE: 26

Ile Ser Phe Asp Gly Asn Asn Gln
1               5

<210> SEQ ID NO 27
<211> LENGTH: 16
<212> TYPE: PRT
<213> ORGANISM: Artificial Sequence
<220> FEATURE:
<223> OTHER INFORMATION: Heavy-chain CDR3

<400> SEQUENCE: 27

Thr Thr Asp Thr Met Ser Gly Tyr Asp Trp Glu Asp Ala Phe Asp Ile
1               5                   10                  15

<210> SEQ ID NO 28
<211> LENGTH: 6
<212> TYPE: PRT
<213> ORGANISM: Artificial Sequence
<220> FEATURE:
<223> OTHER INFORMATION: Light-chain CDR1
```

```
<400> SEQUENCE: 28

Gln Ser Ile Gly Arg Trp
1               5

<210> SEQ ID NO 29
<211> LENGTH: 3
<212> TYPE: PRT
<213> ORGANISM: Artificial Sequence
<220> FEATURE:
<223> OTHER INFORMATION: Light-chain CDR2

<400> SEQUENCE: 29

Ala Ser Ser
1

<210> SEQ ID NO 30
<211> LENGTH: 9
<212> TYPE: PRT
<213> ORGANISM: Artificial Sequence
<220> FEATURE:
<223> OTHER INFORMATION: Light-chain CDR3

<400> SEQUENCE: 30

Gln Gln Ser Tyr Ser Thr Pro Tyr Thr
1               5

<210> SEQ ID NO 31
<211> LENGTH: 8
<212> TYPE: PRT
<213> ORGANISM: Artificial Sequence
<220> FEATURE:
<223> OTHER INFORMATION: Heavy-chain CDR1

<400> SEQUENCE: 31

Gly Phe Ser Phe Ser Asp His Ala
1               5

<210> SEQ ID NO 32
<211> LENGTH: 8
<212> TYPE: PRT
<213> ORGANISM: Artificial Sequence
<220> FEATURE:
<223> OTHER INFORMATION: Heavy-chain CDR2

<400> SEQUENCE: 32

Val Trp Pro Asp Gly Ser Asn Lys
1               5

<210> SEQ ID NO 33
<211> LENGTH: 14
<212> TYPE: PRT
<213> ORGANISM: Artificial Sequence
<220> FEATURE:
<223> OTHER INFORMATION: Heavy-chain CDR3

<400> SEQUENCE: 33

Ala Arg Asp Ser Gly Pro Ile Ser Arg Gly Asp Leu Thr Tyr
1               5                   10

<210> SEQ ID NO 34
<211> LENGTH: 8
<212> TYPE: PRT
<213> ORGANISM: Artificial Sequence
<220> FEATURE:
<223> OTHER INFORMATION: Light-chain CDR1

<400> SEQUENCE: 34
```

```
<210> SEQ ID NO 35
<211> LENGTH: 3
<212> TYPE: PRT
<213> ORGANISM: Artificial Sequence
<220> FEATURE:
<223> OTHER INFORMATION: Light-chain CDR2

<400> SEQUENCE: 35

Glu Asp Asp
1

<210> SEQ ID NO 36
<211> LENGTH: 9
<212> TYPE: PRT
<213> ORGANISM: Artificial Sequence
<220> FEATURE:
<223> OTHER INFORMATION: Light-chain CDR3

<400> SEQUENCE: 36

Gln Ser Tyr Asp Asp Thr Asn Val Val
1               5

<210> SEQ ID NO 37
<211> LENGTH: 363
<212> TYPE: DNA
<213> ORGANISM: Artificial Sequence
<220> FEATURE:
<223> OTHER INFORMATION: VH

<400> SEQUENCE: 37
caggtgcagc tggtggagtc cgggggaggc ttggttcagc ctggggggtc cctgagactc      60
tcctgtgcag cctctggatt cacctttagc agctatgcca tgagctgggt ccgccaggct    120
ccagggaagg gctggagtg gtctcagct attagtggta gtggtggtag cacatactac      180
gcagactccg tgaagggccg gttcaccatc tccagagaca attccaagaa cacgctgtat    240
ctgcaaatga acagtctgag agccgaagac acggccgtgt attactgtgc gagaggcgtg    300
gattcttcta tggtaaccgg atttgatcac tggggccagg gaactttgat caccgtctcc    360
tca                                                                   363

<210> SEQ ID NO 38
<211> LENGTH: 121
<212> TYPE: PRT
<213> ORGANISM: Artificial Sequence
<220> FEATURE:
<223> OTHER INFORMATION: VH

<400> SEQUENCE: 38

Gln Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Ser Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80
```

Gly Gly Ser Ile Ala Ser Asn Tyr
1               5

```
Leu Gln Met Asn Ser Leu Arg Ala Glu Asp Thr Ala Val Tyr Tyr Cys
                85                  90                  95

Ala Arg Gly Val Asp Ser Ser Met Val Thr Gly Phe Asp His Trp Gly
            100                 105                 110

Gln Gly Thr Leu Ile Thr Val Ser Ser
        115                 120
```

<210> SEQ ID NO 39
<211> LENGTH: 324
<212> TYPE: DNA
<213> ORGANISM: Artificial Sequence
<220> FEATURE:
<223> OTHER INFORMATION: VL

<400> SEQUENCE: 39

```
gacatccaga tgacccagtc tccttccacc ctgtctgcat ctgtaggaga cagagtcacc      60
atcacttgcc gggccagtca gagtattagt aggtggttgg cctggtatca gcagaaacca    120
gggaaagccc ctaagttcct gatctatgag gcatctactt tagaaagtgg ggtcccatca    180
aggttcagcg gcagtggaac tggacagaa ttcactctca ccatcagcag cctgcagcct     240
gatgattttg ctacttatta ctgtcaacag tatgaggact acccgctcac cttcggccaa    300
gggacacgac tggaaatcaa acgt                                            324
```

<210> SEQ ID NO 40
<211> LENGTH: 108
<212> TYPE: PRT
<213> ORGANISM: Artificial Sequence
<220> FEATURE:
<223> OTHER INFORMATION: VL

<400> SEQUENCE: 40

```
Asp Ile Gln Met Thr Gln Ser Pro Ser Thr Leu Ser Ala Ser Val Gly
1               5                   10                  15

Asp Arg Val Thr Ile Thr Cys Arg Ala Ser Gln Ser Ile Ser Arg Trp
            20                  25                  30

Leu Ala Trp Tyr Gln Gln Lys Pro Gly Lys Ala Pro Lys Phe Leu Ile
        35                  40                  45

Tyr Glu Ala Ser Thr Leu Glu Ser Gly Val Pro Ser Arg Phe Ser Gly
    50                  55                  60

Ser Gly Thr Gly Thr Glu Phe Thr Leu Thr Ile Ser Ser Leu Gln Pro
65                  70                  75                  80

Asp Asp Phe Ala Thr Tyr Tyr Cys Gln Gln Tyr Glu Asp Tyr Pro Leu
                85                  90                  95

Thr Phe Gly Gln Gly Thr Arg Leu Glu Ile Lys Arg
            100                 105
```

<210> SEQ ID NO 41
<211> LENGTH: 366
<212> TYPE: DNA
<213> ORGANISM: Artificial Sequence
<220> FEATURE:
<223> OTHER INFORMATION: VH

<400> SEQUENCE: 41

```
cagatgcagc tggtacagtc tgaggctgag gtgaagaagc ctggggcctc agtgaaggtt      60
tcctgtaagg catctggata caccttaac agttacgata tacactgggt gcgacaggcc     120
cctggacaag gcttgagtg gatgggagta gtcaacccac tggtggaac ggaagcact       180
gtttacgcac agaagttcga ggacagactc accctgacca cggacatgtc cacaagcaca    240
```

```
gcctacatgg agctgagcag cctgagatct gaggacacgg ccgtgtatta ctgtgcaaga    300
gactataata gggccccgcc tactttggac gtctggggcc aagggaccac gatcaccgtc    360
tcctca                                                                366
```

<210> SEQ ID NO 42
<211> LENGTH: 122
<212> TYPE: PRT
<213> ORGANISM: Artificial Sequence
<220> FEATURE:
<223> OTHER INFORMATION: VH

<400> SEQUENCE: 42

```
Gln Met Gln Leu Val Gln Ser Glu Ala Glu Val Lys Lys Pro Gly Ala
1               5                   10                  15

Ser Val Lys Val Ser Cys Lys Ala Ser Gly Tyr Thr Phe Asn Ser Tyr
            20                  25                  30

Asp Ile His Trp Val Arg Gln Ala Pro Gly Gln Gly Leu Glu Trp Met
        35                  40                  45

Gly Val Val Asn Pro Pro Gly Gly Thr Gly Ser Thr Val Tyr Ala Gln
    50                  55                  60

Lys Phe Glu Asp Arg Leu Thr Leu Thr Thr Asp Met Ser Thr Ser Thr
65                  70                  75                  80

Ala Tyr Met Glu Leu Ser Ser Leu Arg Ser Glu Asp Thr Ala Val Tyr
                85                  90                  95

Tyr Cys Ala Arg Asp Tyr Asn Arg Ala Pro Pro Thr Leu Asp Val Trp
            100                 105                 110

Gly Gln Gly Thr Thr Ile Thr Val Ser Ser
        115                 120
```

<210> SEQ ID NO 43
<211> LENGTH: 333
<212> TYPE: DNA
<213> ORGANISM: Artificial Sequence
<220> FEATURE:
<223> OTHER INFORMATION: VL

<400> SEQUENCE: 43

```
aattttatgc tgactcagcc cgcctccgtg tctgggtccc ctggacagtc gatcaccatc     60
tcctgcactg gaagcagcag cgacgttggt ggttataact atgtctcctg gtaccaacag    120
cacccaggca agccccccca actcatcatt tatgatgtca ctaagcggcc ctcaggggtt    180
tctaatcgct tctccggctc caagtctggc aactcggcct ccctgaccat ctctggactc    240
caggctgagg acgaggctga ttattactgc agctcataca gcagcagcac tttttacgtc    300
ttcggaactg ggaccaaggt caccgtccta ggt                                  333
```

<210> SEQ ID NO 44
<211> LENGTH: 111
<212> TYPE: PRT
<213> ORGANISM: Artificial Sequence
<220> FEATURE:
<223> OTHER INFORMATION: VL

<400> SEQUENCE: 44

```
Asn Phe Met Leu Thr Gln Pro Ala Ser Val Ser Gly Ser Pro Gly Gln
1               5                   10                  15

Ser Ile Thr Ile Ser Cys Thr Gly Ser Ser Ser Asp Val Gly Gly Tyr
            20                  25                  30
```

```
Asn Tyr Val Ser Trp Tyr Gln Gln His Pro Gly Lys Ala Pro Gln Leu
             35                  40                  45

Ile Ile Tyr Asp Val Thr Lys Arg Pro Ser Gly Val Ser Asn Arg Phe
 50                  55                  60

Ser Gly Ser Lys Ser Gly Asn Ser Ala Ser Leu Thr Ile Ser Gly Leu
 65                  70                  75                  80

Gln Ala Glu Asp Glu Ala Asp Tyr Tyr Cys Ser Ser Tyr Ser Ser Ser
                 85                  90                  95

Thr Phe Tyr Val Phe Gly Thr Gly Thr Lys Val Thr Val Leu Gly
            100                 105                 110
```

<210> SEQ ID NO 45
<211> LENGTH: 354
<212> TYPE: DNA
<213> ORGANISM: Artificial Sequence
<220> FEATURE:
<223> OTHER INFORMATION: VH

<400> SEQUENCE: 45

```
caggtgcagc tggtggagtc tgggggaggc ttggtacagc ctggggggtc cctgagactc     60
tcctgtgcag cctctggatt cacctttagc agctatgcca tgacctgggt ccgccaggct    120
ccagggaagg gctggagtg gtctcacgt atcagtggta gtggtgggag cacaaactac    180
gcagactccg tgaagggccg gttcaccatc tccagagaca attccaagaa cacgctgtat    240
ctgcaaatga acagtctgag agccgaggac acggccgtgt attactgtgc aagaggggt    300
ctccatcatg gttttgatat ctggggccaa gggacaatgg tcaccgtctc ctca          354
```

<210> SEQ ID NO 46
<211> LENGTH: 118
<212> TYPE: PRT
<213> ORGANISM: Artificial Sequence
<220> FEATURE:
<223> OTHER INFORMATION: VH

<400> SEQUENCE: 46

```
Gln Val Gln Leu Val Glu Ser Gly Gly Gly Leu Val Gln Pro Gly Gly
 1               5                  10                  15

Ser Leu Arg Leu Ser Cys Ala Ala Ser Gly Phe Thr Phe Ser Ser Tyr
             20                  25                  30

Ala Met Thr Trp Val Arg Gln Ala Pro Gly Lys Gly Leu Glu Trp Val
         35                  40                  45

Ser Arg Ile Ser Gly Ser Gly Gly Ser Thr Asn Tyr Ala Asp Ser Val
     50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Gly Gly Leu His His Gly Phe Asp Ile Trp Gly Gln Gly Thr
            100                 105                 110

Met Val Thr Val Ser Ser
        115
```

<210> SEQ ID NO 47
<211> LENGTH: 327
<212> TYPE: DNA
<213> ORGANISM: Artificial Sequence
<220> FEATURE:
<223> OTHER INFORMATION: VL

<400> SEQUENCE: 47

```
tcctatgagc tgacacagcc accctcactg tcagtggccc cagggaagac ggccaggatt    60
acatgtgacg gggacaacat tgaaagtaaa agtgtccact ggtaccagca gaagccaggc   120
caggcccctg tgctagtcat ctattatgat aatgaccggc cctcagggat ccctgagcga   180
ttctctggct ccaactctgg gaacacggcc accctgacca tcagcagggt cgaagccgga   240
gatgaggccg actattactg tcaggtgtgg gacacttata ccgatcagcc ggtattcggc   300
ggagggacca agctgaccgt cctaggt                                       327
```

<210> SEQ ID NO 48
<211> LENGTH: 109
<212> TYPE: PRT
<213> ORGANISM: Artificial Sequence
<220> FEATURE:
<223> OTHER INFORMATION: VL

<400> SEQUENCE: 48

```
Ser Tyr Glu Leu Thr Gln Pro Pro Ser Leu Ser Val Ala Pro Gly Lys
1               5                   10                  15
Thr Ala Arg Ile Thr Cys Asp Gly Asp Asn Ile Glu Ser Lys Ser Val
            20                  25                  30
His Trp Tyr Gln Gln Lys Pro Gly Gln Ala Pro Val Leu Val Ile Tyr
        35                  40                  45
Tyr Asp Asn Asp Arg Pro Ser Gly Ile Pro Glu Arg Phe Ser Gly Ser
    50                  55                  60
Asn Ser Gly Asn Thr Ala Thr Leu Thr Ile Ser Arg Val Glu Ala Gly
65                  70                  75                  80
Asp Glu Ala Asp Tyr Tyr Cys Gln Val Trp Asp Thr Tyr Thr Asp Gln
                85                  90                  95
Pro Val Phe Gly Gly Gly Thr Lys Leu Thr Val Leu Gly
            100                 105
```

<210> SEQ ID NO 49
<211> LENGTH: 372
<212> TYPE: DNA
<213> ORGANISM: Artificial Sequence
<220> FEATURE:
<223> OTHER INFORMATION: VH

<400> SEQUENCE: 49

```
caggtgcagc tggtagagtc tgggggaggc ttggtacagc ctggggggtc cctgagactc    60
tcctgtatag gctctggctt caccttcagt cgctataaca taaattgggt ccgccaggct   120
ccagggaagg gcctggagtg ggtctcatcc attagtagta gtggaaggtt catccactac   180
gcaggctcag tgaagggccg attcaccgtc tccagagaca acaccaagaa ctcagtgtct   240
ctacaaatga acagtctgag agccgaggac acggccgtgt attactgtgc gagagactct   300
ccaacacagg gcccctacta ctactacggt atggacgtct ggggccaagg gaccacgatc   360
accgtctcct ca                                                      372
```

<210> SEQ ID NO 50
<211> LENGTH: 124
<212> TYPE: PRT
<213> ORGANISM: Artificial Sequence
<220> FEATURE:
<223> OTHER INFORMATION: VH

<400> SEQUENCE: 50

Gln Val Gln Leu Val Glu Ser Gly Gly Gly Leu Val Gln Pro Gly Gly
1               5                   10                  15

Ser Leu Arg Leu Ser Cys Ile Gly Ser Gly Phe Thr Phe Ser Arg Tyr
            20                  25                  30

Asn Ile Asn Trp Val Arg Gln Ala Pro Gly Lys Gly Leu Glu Trp Val
        35                  40                  45

Ser Ser Ile Ser Ser Ser Gly Arg Phe Ile His Tyr Ala Gly Ser Val
    50              55                  60

Lys Gly Arg Phe Thr Val Ser Arg Asp Asn Lys Asn Ser Val Ser
65                  70                  75                  80

Leu Gln Met Asn Ser Leu Arg Ala Glu Asp Thr Ala Val Tyr Tyr Cys
                85                  90                  95

Ala Arg Asp Ser Pro Thr Gln Gly Pro Tyr Tyr Tyr Tyr Gly Met Asp
            100                 105                 110

Val Trp Gly Gln Gly Thr Thr Ile Thr Val Ser Ser
        115                 120

<210> SEQ ID NO 51
<211> LENGTH: 327
<212> TYPE: DNA
<213> ORGANISM: Artificial Sequence
<220> FEATURE:
<223> OTHER INFORMATION: VL

<400> SEQUENCE: 51
tcctatgagc tgacacagcc accctcagag tcagtggccc caggaaagac ggccacaatt     60
acttgtgggg gaaataaaat tggaagtaaa agtgtgcact ggtaccaaca gaagccaggc    120
caggcccctc taatggtcat ctattatgat agcgaccggc cctcagggat ccctgagcga    180
ttctctggct ccaactctgg gaacacggcc accctgacca tcagcagggt cgaggtcggg    240
gatgaggccg actattactg tcaggtgtgg gatagtagta gcgatcgtcc ggtgttcggc    300
ggagggacca agctgaccgt cctaggt                                         327

<210> SEQ ID NO 52
<211> LENGTH: 109
<212> TYPE: PRT
<213> ORGANISM: Artificial Sequence
<220> FEATURE:
<223> OTHER INFORMATION: VL

<400> SEQUENCE: 52

Ser Tyr Glu Leu Thr Gln Pro Pro Ser Glu Ser Val Ala Pro Gly Lys
1               5                   10                  15

Thr Ala Thr Ile Thr Cys Gly Gly Asn Lys Ile Gly Ser Lys Ser Val
            20                  25                  30

His Trp Tyr Gln Gln Lys Pro Gly Gln Ala Pro Leu Met Val Ile Tyr
        35                  40                  45

Tyr Asp Ser Asp Arg Pro Ser Gly Ile Pro Glu Arg Phe Ser Gly Ser
    50              55                  60

Asn Ser Gly Asn Thr Ala Thr Leu Thr Ile Ser Arg Val Glu Val Gly
65                  70                  75                  80

Asp Glu Ala Asp Tyr Tyr Cys Gln Val Trp Asp Ser Ser Ser Asp Arg
                85                  90                  95

Pro Val Phe Gly Gly Gly Thr Lys Leu Thr Val Leu Gly
            100                 105

<210> SEQ ID NO 53

```
<211> LENGTH: 369
<212> TYPE: DNA
<213> ORGANISM: Artificial Sequence
<220> FEATURE:
<223> OTHER INFORMATION: VH

<400> SEQUENCE: 53
caggtgcagc tggtgcagtc tggaggaggc ttgatccagc ctgggggtc cctgagactc      60 tcctgtgcag cctctggatt caccttcagt gactatgcta tgcactgggt ccgccaggct    120
cctggcaagg ggctggagtg ggtggcactc atatcttttg atgggaataa tcaatactac    180
gcagactccg tgaagggccg attcaccatc tccagagaca attcgaagaa cacaatatat    240
ctgcaaatga acagtctgag agccgaggac acggccgtgt actactgtac cacagatacg    300
atgagtggct acgattggga agatgctttt gatatctggg gccaagggac aatgatcacc    360
gtctcctca                                                            369

<210> SEQ ID NO 54
<211> LENGTH: 123
<212> TYPE: PRT
<213> ORGANISM: Artificial Sequence
<220> FEATURE:
<223> OTHER INFORMATION: VH

<400> SEQUENCE: 54

Gln Val Gln Leu Val Gln Ser Gly Gly Gly Leu Ile Gln Pro Gly Gly
1               5                   10                  15

Ser Leu Arg Leu Ser Cys Ala Ala Ser Gly Phe Thr Phe Ser Asp Tyr
            20                  25                  30

Ala Met His Trp Val Arg Gln Ala Pro Gly Lys Gly Leu Glu Trp Val
        35                  40                  45

Ala Leu Ile Ser Phe Asp Gly Asn Asn Gln Tyr Tyr Ala Asp Ser Val
    50                  55                  60

Lys Gly Arg Phe Thr Ile Ser Arg Asp Asn Ser Lys Asn Thr Ile Tyr
65                  70                  75                  80

Leu Gln Met Asn Ser Leu Arg Ala Glu Asp Thr Ala Val Tyr Tyr Cys
                85                  90                  95

Thr Thr Asp Thr Met Ser Gly Tyr Asp Trp Glu Asp Ala Phe Asp Ile
            100                 105                 110

Trp Gly Gln Gly Thr Met Ile Thr Val Ser Ser
        115                 120

<210> SEQ ID NO 55
<211> LENGTH: 342
<212> TYPE: DNA
<213> ORGANISM: Artificial Sequence
<220> FEATURE:
<223> OTHER INFORMATION: VL

<400> SEQUENCE: 55
gacatccaga tgacccagtc tccatcctcc ctgtctgcat ctatcggcga cagagtcacc      60
atcacttgcc gggccagtca gagtattggt agtggttgg cctggtatca gcagaaacca    120
gggaaagccc ctaagctcct gatctatgct gcatccagtt tgcaaagtgg ggtcccatca    180
aggttcagtg gcagtggatc tgggacagat ttcactctca ccatcagcag tctgcaacct    240
gaagattttg caacttacta ctgtcaacag agttacagta cccgtacac ttttggccaa    300 gggaccaagg tggagatcaa acgtggagga gccagcctcg tg                       342
```

<210> SEQ ID NO 56
<211> LENGTH: 108
<212> TYPE: PRT
<213> ORGANISM: Artificial Sequence
<220> FEATURE:
<223> OTHER INFORMATION: VL

<400> SEQUENCE: 56

```
Asp Ile Gln Met Thr Gln Ser Pro Ser Ser Leu Ser Ala Ser Ile Gly
1               5                   10                  15

Asp Arg Val Thr Ile Thr Cys Arg Ala Ser Gln Ser Ile Gly Arg Trp
            20                  25                  30

Leu Ala Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Tyr
                85                  90                  95

Thr Phe Gly Gln Gly Thr Lys Val Glu Ile Lys Arg
            100                 105
```

<210> SEQ ID NO 57
<211> LENGTH: 363
<212> TYPE: DNA
<213> ORGANISM: Artificial Sequence
<220> FEATURE:
<223> OTHER INFORMATION: VH

<400> SEQUENCE: 57

```
caggtgcagc tggtggagtc tgggggaggc gtggtccagc ccgggaggtc ccttagactc    60
tcctgttcag cgtctggatt ctccttcagt gatcatgcca tgcactgggt ccgccaggct   120
ccaggcaggg gcctagaatg ggtggcaact gtttggcctg atggaagtaa taaatattat   180
gtagattctg tgaacggtcg attcagcatt ccagagaca attccaagaa cacagtgtct   240
ctgcaaatga acagtctgag agccgaggac acggccgtgt attactgtgc acgagattcg   300
ggacctatca gccgcggaga tttgacttac tggggcccgg gagtcctggt caccgtctcc   360
tca                                                                 363
```

<210> SEQ ID NO 58
<211> LENGTH: 121
<212> TYPE: PRT
<213> ORGANISM: Artificial Sequence
<220> FEATURE:
<223> OTHER INFORMATION: VH

<400> SEQUENCE: 58

```
Gln Val Gln Leu Val Glu Ser Gly Gly Gly Val Val Gln Pro Gly Arg
1               5                   10                  15

Ser Leu Arg Leu Ser Cys Ser Ala Ser Gly Phe Ser Phe Ser Asp His
            20                  25                  30

Ala Met His Trp Val Arg Gln Ala Pro Gly Arg Gly Leu Glu Trp Val
        35                  40                  45

Ala Thr Val Trp Pro Asp Gly Ser Asn Lys Tyr Tyr Val Asp Ser Val
    50                  55                  60

Asn Gly Arg Phe Ser Ile Ser Arg Asp Asn Ser Lys Asn Thr Val Ser
65                  70                  75                  80
```

```
Leu Gln Met Asn Ser Leu Arg Ala Glu Asp Thr Ala Val Tyr Tyr Cys
                    85                  90                  95

Ala Arg Asp Ser Gly Pro Ile Ser Arg Gly Asp Leu Thr Tyr Trp Gly
                100                 105                 110

Pro Gly Val Leu Val Thr Val Ser Ser
            115                 120

<210> SEQ ID NO 59
<211> LENGTH: 351
<212> TYPE: DNA
<213> ORGANISM: Artificial Sequence
<220> FEATURE:
<223> OTHER INFORMATION: VL

<400> SEQUENCE: 59
aattttatgc tgactcagcc ccactctgtg tcggagtctc cggggaagac tgtaatcatc      60
tcctgcaccg gcagcggtgg cagcattgcc agcaactatg tgcagtggta ccagcagcgc     120
ccgggcagtg cccccaccat tgtgatctat gaagatgatc agagaccctc tggggtccct     180
gatcggtact ctggctccac cgacagctcc tccaactctg cctccctcac catctctgga     240
ctgagggctg aggacgaggc tgactactac tgtcagtctt atgacgatac caatgtggtg     300
ttcggcggag ggaccaagct gaccgtccta ggtggaggag ccagcctcgt g              351

<210> SEQ ID NO 60
<211> LENGTH: 111
<212> TYPE: PRT
<213> ORGANISM: Artificial Sequence
<220> FEATURE:
<223> OTHER INFORMATION: VL

<400> SEQUENCE: 60

Asn Phe Met Leu Thr Gln Pro His Ser Val Ser Glu Ser Pro Gly Lys
1               5                   10                  15

Thr Val Ile Ile Ser Cys Thr Gly Ser Gly Gly Ser Ile Ala Ser Asn
                20                  25                  30

Tyr Val Gln Trp Tyr Gln Gln Arg Pro Gly Ser Ala Pro Thr Ile Val
            35                  40                  45

Ile Tyr Glu Asp Asp Gln Arg Pro Ser Gly Val Pro Asp Arg Tyr Ser
    50                  55                  60

Gly Ser Thr Asp Ser Ser Ser Asn Ser Ala Ser Leu Thr Ile Ser Gly
65                  70                  75                  80

Leu Arg Ala Glu Asp Glu Ala Asp Tyr Tyr Cys Gln Ser Tyr Asp Asp
                85                  90                  95

Thr Asn Val Val Phe Gly Gly Gly Thr Lys Leu Thr Val Leu Gly
                100                 105                 110
```

ANTI-TIE2 ANTIBODY AND USE THEREOF

CROSS-REFERENCE TO RELATED APPLICATIONS

This is a United States national phase under 35 USC § 371 of International Patent Application No. PCT/KR20/10910 filed Aug. 14, 2020, which in turn claims priority under 35 USC § 119 of Korean Patent Application No. 10-2019-0099491 filed Aug. 14, 2019. The disclosures of all such applications are hereby incorporated herein by reference in their respective entireties, for all purposes.

REFERENCE TO SEQUENCE LISTING SUBMITTED VIA EFS-WEB

This application includes an electronically submitted sequence listing in .txt format. The .txt file contains a sequence listing entitled "587_SeqListing_ST25.txt" created on Oct. 29, 2021 and is 27,103 bytes in size. The sequence listing contained in this .txt file is part of the specification and is hereby incorporated by reference herein in its entirety.

TECHNICAL FIELD

The present invention relates to an antibody that specifically binds to TIE2 (tyrosine-protein kinase receptor) and has the function of normalizing and stabilizing blood vessels through phosphorylation of the receptor. More particularly, the present invention relates to an anti-TIE2 antibody, a nucleic acid encoding the same, a vector including the nucleic acid, a cell transformed with the vector, a vascular stabilizer and a composition for treating angiogenesis-related diseases containing the same, a pharmaceutical composition for treating a tumor or cancer, and a composition for combined administration with a drug other than the antibody binding to TIE2.

BACKGROUND ART

Angiogenesis is a mechanism by which new blood vessels are formed from existing blood vessels through the growth, division, migration and the like of endothelial cells, and plays a key role in the normal growth process including wound healing and the menstrual cycle of women (Risau, Nature, 386:671, 1997). In addition, abnormally excessive angiogenesis is known to greatly affect diseases such as tumor growth and metastasis, age-related macular degeneration (ARMD), diabetic retinopathy, psoriasis, rheumatoid arthritis and chronic inflammation (Carmeliet and Jain, Nature, 407:249, 2000).

The progression of angiogenesis is determined by the overall balance of angiogenesis-inducing factors and angiogenesis inhibitors, and is carried out through a complicated and sequential process involving several stages. The angiogenesis process is as follows. First, various angiogenesis-inducing factors including vascular endothelial growth factor (VEGF) secreted from tumors or wounded tissues bind to the corresponding receptors of existing vascular endothelial cells disposed adjacent thereto to activate the vascular endothelial cells and thereby improve the permeability of the vascular endothelial cells, and secrete proteolytic enzymes such as matrix metalloproteinase (MMP) to break down the matrix and the extracellular matrix around the vascular endothelial cells to thereby cause vascular endothelial cells to proliferate and migrate from existing capillaries toward tissues that secrete angiogenesis-inducing factors.

The migrated and proliferated vascular endothelial cells form an intravascular structure, and finally the vascular pericytes, which are structural supporters of the vascular endothelial cells, are introduced, resulting in stable and mature angiogenesis. At this time, ANG1 secreted from the vascular endothelial cells is known to bind to the receptor thereof, TIE-2, to thereby play a key role in the introduction of vascular pericytes and stabilization of blood vessels (Suri et al., Cell, 87:1171, 1996).

Meanwhile, ANG2 is overexpressed in cancer tissues, in which angiogenesis actively occurs, or the placenta, uterus, and ovary, which are normal tissues in which blood vessel remodeling actively occurs (Kong et al., *Cancer Res.*, 61:6248, 2001; Ahmad et al., *Cancer,* 92:1138, 2001), and when ANG2 is present in an amount higher than ANG1, tumor angiogenesis is consequently initiated (Linda et al., *Cell Research,* 13(5); 309-317, 2003). Therefore, it is interpreted that ANG2 acts as an antagonist in the TIE-2 signaling mechanism to promote angiogenesis, whereas ANG1 acts as an agonist to normalize the vascular structure.

As described above, the angiogenesis process is mainly accomplished by the VEGF/VEGFR2 signaling mechanism, but in order to overcome vascular leakage caused by angiogenesis, the ANG1-TIE2 signaling mechanism is important in consideration of the junction of vascular endothelial cells and recruitment of vascular pericytes.

In particular, when the interstitial pressure increases due to vascular leakage, hypoxia and tissue-centered necrosis occur in new blood vessels in the tumor due to vascular compression (Folkman J. et al., *N. Engl. J. Med.* 333:1757-63, 1995). For this reason, even if the tumor is treated with therapeutic agents, the therapeutic effect is reduced due to reduced accessibility of the drug to the inside of the tissue (Gianfranco Baronzio et al., *Front. Oncol.* 5: 165, 2015).

Therefore, the leakage of new blood vessels in the tumor can be solved to accomplish vessel normalization by activating the TIE2 phosphorylation signaling mechanism. This is ultimately expected to increase drug delivery and thereby provide anticancer activity superior to that of a single conventional therapy. In addition, vascular normalization lowers the interstitial pressure in tissues to alleviate hypoxia, and thus is expected to have high potential to treat diseases caused by vascular leakage, such as foot ulcers, hypertension, and diabetic retinal disease.

In addition, because the microenvironment in the tumor is reprogrammed from the existing immunosuppressive state to the immunosupportive state as the influx of immune effector T cells increases through vascular normalization upon treatment with vascular stabilizers (Huang et al., 2013, *Cancer Research*), the anti-TIE2 antibody induces vascular normalization to thereby increase the influx of the immune effector T cells upon administration in combination with an immune checkpoint inhibitor or the like to enhance the immune activity and thereby double the anticancer activity.

Under the above-mentioned technical background, the present inventors endeavored to develop an anti-TIE2 antibody. As a result, the present inventors have developed an anti-TIE2 antibody that exhibits desired binding ability to TIE2, found that this anti-TIE2 antibody acts as a vessel stabilizer having an effect of ameliorating vascular leakage and predicted that the anti-TIE2 antibody would be applicable as a therapeutic agent for most kinds of cancer and to the treatment of foot ulcers and diabetic retinal diseases related to abnormal angiogenesis in addition to cancer. In particular, it is expected that the TIE2 anticancer antibody will be able to stabilize blood vessels through co-administration with conventional therapeutic agents, thereby increasing the delivery rate of conventional therapeutic agents and improving the immune environment in the microenvironment within tumors, thereby exhibiting excellent anticancer effects in conjunction with immunotherapeutic agents. Based thereon, the present invention has been completed to develop.

DISCLOSURE

Therefore, it is one object of the present invention to provide a novel antibody to TIE2 or an antigen-binding fragment thereof.

It is another object of the present invention to provide a nucleic acid encoding the antibody or an antigen-binding fragment thereof.

It is another object of the present invention to provide a vector including the nucleic acid, a cell transformed with the vector, and a method for preparing the same.

It is another object of the present invention to provide a pharmaceutical composition for preventing and/or treating a tumor or an angiogenesis-related disease comprising the antibody or an antigen-binding fragment thereof as an active ingredient.

It is another object of the present invention to provide a pharmaceutical composition for stabilizing and/or normalizing vessels comprising the antibody or an antigen-binding fragment thereof as an active ingredient.

It is another object of the present invention to provide a pharmaceutical composition for a single therapy and/or for a combined therapy with another therapeutic agent comprising the antibody or an antigen-binding fragment thereof as an active ingredient.

In accordance with an aspect of the present invention, the above and other objects can be accomplished by the provision of an antibody or an antigen-binding fragment thereof binding to TIE-2 (tyrosine-protein kinase receptor) comprising:

a heavy-chain variable region comprising a heavy-chain CDR1 selected from the group consisting of SEQ ID NOS: 1, 7, 13, 19, 25 and 31, a heavy-chain CDR2 selected from the group consisting of SEQ ID NOS: 2, 8, 14, 20, 26 and 32, and a heavy-chain CDR3 selected from the group consisting of SEQ ID NOS: 3, 9, 15, 21, 27 and 33, and a light-chain variable region comprising a light-chain CDR1 selected from the group consisting of SEQ ID NOS: 4, 10, 16, 22, 28 and 34, a light-chain CDR2 selected from the group consisting of SEQ ID NOS: 5, 11, 17, 23, 29 and 35, and a light-chain CDR3 selected from the group consisting of SEQ ID NOS: 6, 12, 18, 24, 30 and 36.

In accordance with another aspect of the present invention, there is provided that a nucleic acid encoding the antibody or an antigen-binding fragment thereof.

In accordance with another aspect of the present invention, there is provided that a vector including the nucleic acid.

In accordance with another aspect of the present invention, there is provided that a cell transformed with the vector. In accordance with another aspect of the present invention, there is provided a method of producing an antibody binding to TIE-2 or antigen-binding fragment thereof including (a) culturing the cell and (b) recovering an antibody or antigen-binding fragment thereof from the cultured cell.

In accordance with another aspect of the present invention, there is provided that a vascular stabilizer and/or a composition for treating an angiogenesis-related disease comprising the antibody or antigen-binding fragment thereof.

In accordance with another aspect of the present invention, there is provided that a vascular stabilizer and/or a composition for diagnosing an angiogenesis-related disease comprising the antibody or antigen-binding fragment thereof.

In accordance with another aspect of the present invention, there is provided that a composition for preventing or treating a tumor or cancer and/or an angiogenesis-related disease comprising the antibody or antigen-binding fragment thereof.

In accordance with another aspect of the present invention, there is provided that a composition for combined administration with a TIE2 antibody.

DESCRIPTION OF DRAWINGS

FIGS. 1A and 1B are results of flow cytometry evaluating the binding of anti-TIE2 antibodies to human and mouse TIE2-expressing cells, respectively.

FIG. 2 is a result of ELISA of evaluating the binding of the transiently expressed and purified anti-TIE2 antibodies to human and mouse TIE2.

FIGS. 3A to 3C are results of evaluating the effect of anti-TIE2 antibodies on cell migration using HUVEC cell lines.

FIG. 4 is a result showing that the selected anti-TIE2 antibody binds to TIE2 non-competitively with ANG1 or ANG2.

FIGS. 5A to 5C are results showing that the selected anti-TIE2 antibody can inhibit VEGF-induced vessel permeability.

FIG. 6 is a result showing that the selected anti-TIE2 antibody follows the TIE2 downstream signaling mechanism, similarly to ANG1.

FIG. 7 is a result showing the cell-to-cell adherens junction at the protein level of the cell line to determine the vessel stabilization effect of the selected anti-TIE2 antibody.

FIGS. 8A and 8B show the improvement of cell-to-cell adherence junction by the anti-Tie2 antibody.

FIG. 9 shows that the anti-TIE2 antibody can normalize VEGF-induced vascular leakage through TIE2 signaling in the mouse ear.

FIGS. 10A to 10C show the results of evaluating the retinal angiogenesis inhibitory function of the anti-Tie2 antibody.

FIGS. 11A and 11B show the results of evaluating the normalization function of tumor vessels of the anti-Tie2 antibody.

FIGS. 12A to 12D show the results of evaluating the anti-tumor efficacy of the anti-Tie2 antibody.

FIGS. 13A to 13C show the results of evaluating the hypoxia alleviation effect of the anti-Tie2 antibody.

BEST MODE

Unless defined otherwise, all technical and scientific terms used herein have the same meanings as those appreciated by those skilled in the field to which the present invention pertains. In general, the nomenclature used herein is well-known in the art and is ordinarily used.

The present inventors selected a novel anti-TIE2 antibody. When TIE2 is activated by the antibody or antigen-binding fragment that binds to TIE2 according to the present invention, blood vessels can be normalized to avoid the increase in hypoxia inside a tumor or cancer, increase blood flow to the tumor or cancer, and provide sufficient oxygen supply, thereby increasing the amount of other anticancer drugs delivered and the penetration of immune cells.

In one aspect, the present invention is directed to an antibody or an antigen-binding fragment thereof binding to TIE-2 including a heavy-chain variable region comprising a heavy-chain CDR1 selected from the group consisting of SEQ ID NOS: 1, 7, 13, 19, 25 and 31, a heavy-chain CDR2 selected from the group consisting of SEQ ID NOS: 2, 8, 14, 20, 26 and 32, and a heavy-chain CDR3 selected from the group consisting of SEQ ID NOS: 3, 9, 15, 21, 27 and 33, and a light-chain variable region comprising a light-chain CDR1 selected from the group consisting of SEQ ID NOS: 4, 10, 16, 22, 28 and 34, a light-chain CDR2 selected from the group consisting of SEQ ID NOS: 5, 11, 17, 23, 29 and 35, and a light-chain CDR3 selected from the group consisting of SEQ ID NOS: 6, 12, 18, 24, 30 and 36.

As used herein, the term "antibody" refers to an antibody that specifically binds to TIE-2. The scope of the present invention includes not only a complete antibody specifically binding to TIE2 but also an antigen-binding fragment of the antibody molecule.

The term "whole antibody" refers to a structure having two full-length light chains and two full-length heavy chains, wherein each light chain is linked to a corresponding heavy chain by a disulfide bond. The heavy-chain constant region has gamma (γ), mu (μ), alpha (α), delta (δ) and epsilon (ε) types, and is sub-classified into gamma 1 (γ1), gamma 2 (γ2), gamma 3 (γ3), gamma 4 (γ4), alpha 1 (α1) and alpha 2 (α2). The light-chain constant region has kappa (κ) and lambda (λ) types.

The antigen-binding fragment of an antibody or antibody fragment is a fragment that has antigen-binding capacity and includes Fab, F(ab'), F(ab')2, Fv and the like. Among the antibody fragments, Fab refers to a structure including a variable region of each of the heavy chain and the light chain, the constant region of the light chain, and the first constant domain (CH1) of the heavy chain, each having one antigen-binding site. Fab' is different from Fab in that it further includes a hinge region including at least one cysteine residue at the C-terminus of the CH1 domain of the heavy chain. F(ab')2 is created by a disulfide bond between cysteine residues in the hinge region of Fab'. Fv is the minimal antibody fragment having only a heavy-chain variable region and a light-chain variable region. Two-chain Fv is a fragment wherein the variable region of the heavy chain and the variable region of the light chain are linked by a non-covalent bond, and single-chain Fv (scFv) is a fragment wherein the variable region of the heavy chain and the variable region of the light chain are generally linked by a covalent bond via a peptide linker therebetween, or are directly linked at the C-terminal, forming a dimer-shaped structure, like the two-chain Fv. Such antibody fragments may be obtained using proteases (e.g., Fab can be obtained by restriction-cleaving the complete antibody with papain, and the F(ab')2 fragment can be obtained by cleaving the complete antibody with pepsin), and may be also prepared using genetic recombination techniques.

In one embodiment, the antibody of the present invention is in an Fv form (for example, scFv) or a complete antibody form. In addition, the heavy-chain constant region may have a isotype selected from gamma (γ), mu (u), alpha (α), delta (δ) and epsilon (c). For example, the constant region may be gamma 1 (IgG1), gamma 3 (IgG3) or gamma 4 (IgG4). The light-chain constant region may have kappa or lambda type.

As used herein, the term "heavy chain" encompasses both a full-length heavy chain, which includes a variable domain (VH), containing an amino acid sequence having a variable region sequence sufficient for imparting specificity to an antigen and three constant domains (CH1, CH2 and CH3), and a fragment thereof. As used herein, the term "light chain" encompasses both a full-length light chain, which includes a variable domain (VL) containing an amino acid sequence having a variable region sequence sufficient for imparting specificity to an antigen and a constant domain (CL), and a fragment thereof.

The antibody of the present invention includes, but is not limited to, monoclonal antibodies, multispecific antibodies, human antibodies, humanized antibodies, chimeric antibodies, scFVs, single-chain antibodies, Fab fragments, F(ab') fragments, disulfide-bond Fvs (sdFVs), anti-idiotypic (anti-Id) antibodies, epitope-binding fragments of such antibodies, and the like.

The term "monoclonal antibody" refers to an identical antibody, which is obtained from a population of substantially homogeneous antibodies, that is, each antibody constituting the population, excluding possible naturally occurring mutations that may be present in trivial amounts. Monoclonal antibodies are highly specific and are thus induced against a single antigenic site. Unlike conventional (polyclonal) antibody preparations that typically include different antibodies directed against different determinants (epitopes), each monoclonal antibody is directed against a single determinant on the antigen.

The term "epitope" refers to a protein determinant to which an antibody can specifically bind. Epitopes usually consist of a group of chemically active surface molecules, such as amino acid or sugar side chains, and generally have not only specific three-dimensional structural characteristics but also specific charge characteristics. Three-dimensional epitopes are distinguished from non-three-dimensional epitopes in that a bond to the former is broken in the presence of a denatured solvent, while a bond to the latter is not broken.

The non-human (e.g., murine) antibody of the "humanized" form is a chimeric antibody including one or more amino acid sequences (e.g., CDR sequences) derived from one or more non-human antibodies (donor or source antibodies) containing minimal sequences derived from non-human immunoglobulins. In most cases, the humanized antibody is a human immunoglobulin (receptor antibody) in which a residue from the hypervariable region of a receptor is replaced with a residue from the hypervariable region of a non-human species (donor antibody) such as a mouse, rat, rabbit or non-human primate having the desired specificity, affinity and ability. For humanization, residues in one or more framework domains (FRs) of the variable region of the receptor human antibody may be replaced with corresponding residues from the non-human species donor antibody. This enables the grafted CDR(s) to maintain the proper three-dimensional configuration, thereby improving affinity and antibody stability. Humanized antibodies may further include new residues that do not appear in acceptor or donor antibodies, for example, to further refine antibody performance.

As used herein, the term "human antibody" refers to a molecule derived from human immunoglobulin, in which all of the amino acid sequences constituting the antibody including a complementarity-determining region and a structural region are composed of human immunoglobulins.

A part of the heavy chain and/or light chain is identical to or homologous with the corresponding sequence in an antibody derived from a particular species or belonging to a particular antibody class or subclass, while the remaining chain(s) includes "chimeric" antibodies (immunoglobulins) which are identical to or homologous with corresponding sequences in an antibody derived from another species or belonging to another antibody class or subclass, as well as fragments of such antibody exhibiting the desired biological activity.

As used herein, the term "antibody variable domain" refers to the light- and heavy-chain regions of an antibody molecule including the amino acid sequences of a complementarity-determining region (CDR; i.e., CDR1, CDR2, and CDR3) and a framework region (FR). VH refers to a variable domain of the heavy chain. VL refers to a variable domain of the light chain.

The term "complementarity-determining region" (CDR, that is, CDR1, CDR2, and CDR3), refers to an amino acid residue of the antibody variable domain, which is necessary for antigen binding. Each variable domain typically has three CDR regions, identified as CDR1, CDR2, and CDR3.

Specifically, the antibody or an antigen-binding fragment thereof comprises: a heavy-chain variable region comprising a heavy-chain CDR1 of SEQ ID NO: 1, a heavy-chain CDR2 of SEQ ID NO: 2 and a heavy-chain CDR3 of SEQ ID NO: 3, and a light-chain variable region comprising a light-chain CDR1 of SEQ ID NO: 4, a light-chain CDR2 of SEQ ID NO: 5 and a light-chain CDR3 of SEQ ID NO: 6;
  a heavy-chain variable region comprising a heavy-chain CDR1 of SEQ ID NO: 7, a heavy-chain CDR2 of SEQ ID NO: 8 and a heavy-chain CDR3 of SEQ ID NO: 9, and a light-chain variable region comprising a light-chain CDR1 of SEQ ID NO: 10, a light-chain CDR2 of SEQ ID NO: 11, and a light-chain CDR3 of SEQ ID NO: 12;
  a heavy-chain variable region comprising a heavy-chain CDR1 of SEQ ID NO: 13, a heavy-chain CDR2 of SEQ ID NO: 14 and a heavy-chain CDR3 of SEQ ID NO: 15, and a light-chain variable region comprising a light-chain CDR1 of SEQ ID NO: 16, a light-chain CDR2 of SEQ ID NO: 17, and a light-chain CDR3 of SEQ ID NO: 18;
  a heavy-chain variable region comprising a heavy-chain CDR1 of SEQ ID NO: 19, a heavy-chain CDR2 of SEQ ID NO: 20 and a heavy-chain CDR3 of SEQ ID NO: 21, and a light-chain variable region comprising a light-chain CDR1 of SEQ ID NO: 22, a light-chain CDR2 of SEQ ID NO: 23, and a light-chain CDR3 of SEQ ID NO: 24;
  a heavy-chain variable region comprising a heavy-chain CDR1 of SEQ ID NO: 25, a heavy-chain CDR2 of SEQ ID NO: 26 and a heavy-chain CDR3 of SEQ ID NO: 27, and a light-chain variable region comprising a light-chain CDR1 of SEQ ID NO: 28, a light-chain CDR2 of SEQ ID NO: 29, and a light-chain CDR3 of SEQ ID NO: 30; or
  a heavy-chain variable region comprising a heavy-chain CDR1 of SEQ ID NO: 31, a heavy-chain CDR2 of SEQ ID NO: 32 and a heavy-chain CDR3 of SEQ ID NO: 33, and a light-chain variable region comprising a light-chain CDR1 of SEQ ID NO: 34, a light-chain CDR2 of SEQ ID NO: 35, and a light-chain CDR3 of SEQ ID NO: 36.

The term "framework region" (FR) refers to a variable domain residue other than a CDR residue. Each variable domain typically has four FRs, identified as FR1, FR2, FR3, and FR4.

The anti-TIE2 antibody may be a monovalent or divalent form, and may include single or double chains. Functionally, the binding affinity of the anti-TIE2 antibody ranges from $10^{-5}$ M to $10^{-12}$ M. For example, the binding affinity of the anti-TIE2 antibody is $10^{-6}$ M to $10^{-12}$ M, $10^{-7}$ M to $10^{-12}$ M, $10^{-8}$ M to $10^{-12}$ M, $10^{-9}$ M to $10^{-12}$ M, $10^{-5}$ M to $10^{-11}$ M, $10^{-6}$ M to $10^{-11}$ M, $10^{-7}$ M to $10^{-11}$ M, $10^{-8}$ M to $10^{-11}$ M, $10^{-9}$ M to $10^{-11}$ M, $10^{-10}$ M to $10^{-11}$ M, $10^{-5}$ M to $10^{-10}$ M, $10^{-6}$ M to $10^{-10}$ M, $10^{-7}$ M to $10^{-10}$ M, $10^{-8}$ M to $10^{-10}$ M, $10^{-9}$ M to $10^{-10}$ M, $10^{-5}$ M to $10^{-9}$ M, $10^{-6}$ M to $10^{-9}$ M, $10^{-7}$ M to $10^{-9}$ M, $10^{-8}$ M to $10^{-9}$ M, $10^{-5}$ M to $10^{-8}$ M, $10^{-6}$ M to $10^{-8}$ M, $10^{-7}$ M to $10^{-8}$ M, $10^{-5}$ M to $10^{-7}$ M, $10^{-6}$ M to $10^{-7}$ M or $10^{-5}$ M to $10^{-6}$ M.

The antibody binding to TIE2 or an antigen-binding fragment thereof may comprise a heavy-chain variable region selected from the group consisting of SEQ ID NOS: 38, 42, 46, 50, 54 and 58. In addition, the antibody binding to TIE2 or an antigen-binding fragment thereof may comprise a light-chain variable region selected from the group consisting of SEQ ID NOS: 40, 44, 48, 52, 56 and 60.

Specifically, the antibody binding to TIE2 or an antigen-binding fragment thereof comprises: the heavy-chain variable region of SEQ ID NO: 38 and the light-chain variable region of SEQ ID NO: 40;
  the heavy-chain variable region of SEQ ID NO: 42 and the light-chain variable region of SEQ ID NO: 44;
  the heavy-chain variable region of SEQ ID NO: 46 and the light-chain variable region of SEQ ID NO: 48;
  the heavy-chain variable region of SEQ ID NO: 50 and the light-chain variable region of SEQ ID NO: 52;
  the heavy-chain variable region of SEQ ID NO: 54 and the light-chain variable region of SEQ ID NO: 56; or
  the heavy-chain variable region of SEQ ID NO: 58 and the light-chain variable region of SEQ ID NO: 60.

"Phage display" is a technique for displaying a mutant polypeptide as a fusion protein with at least a part of a coat protein on the surface of the particle of a phage, for example a fibrous phage. The usefulness of phage display is to rapidly and efficiently classify sequences that bind to target antigens with high affinity in large libraries of randomized protein mutants. Displaying peptides and protein libraries on phages has been used to screen millions of polypeptides in order to identify polypeptides with specific binding properties.

Phage display technology has offered a powerful tool for producing and screening novel proteins that bind to specific ligands (e.g., antigens). Using phage display technology, large libraries of protein mutants can be generated, and sequences binding with high affinity to target antigens can be rapidly classified. The nucleic acid encoding mutant polypeptides is fused with a nucleic acid sequence encoding a viral coat protein, e.g., a gene III or gene VIII protein. A monophasic phage display system, in which a nucleic acid sequence encoding a protein or polypeptide is fused with a nucleic acid sequence encoding a part of the gene III protein, has been developed. In the monophasic display system, a fused gene is expressed at a low level, and a wild-type gene III protein is also expressed, and thus particle infectivity is maintained.

It is important to demonstrate the expression of peptides on the fibrous phage surface and the expression of functional antibody fragments in the peripheral cytoplasm of *E. coli* for the development of antibody phage display libraries. Libraries of antibody- or antigen-binding polypeptides are produced through a number of methods, for example, methods of modifying a single gene by inserting a random DNA sequence or cloning a related gene sequence. Libraries can be screened regarding the expression of antibody- or antigen-binding proteins having desired characteristics.

Phage display technology has several advantages over conventional hybridomas and recombinant methods for producing antibodies having desired characteristics. This technique provides the generation of large antibody libraries with a variety of sequences within a short time without using animals. The production of hybridomas and the production of humanized antibodies may require a production time of several months. In addition, since no immunity is required, the phage antibody libraries can generate antibodies against antigens that are toxic or have low antigenicity. The phage antibody libraries can also be used to produce and identify novel therapeutic antibodies.

Techniques for generating human antibodies from immunized or non-immunized human germline sequences, or naive B cell Ig repertoires using phage display libraries can be used. Naive or non-immunogenic antigen-binding libraries can be produced using various lymphatic tissues.

Techniques for identifying and separating high-affinity antibodies from phage display libraries are important for the separation of new therapeutic antibodies. The separation of high-affinity antibodies from the libraries depends on the size of the libraries, the production efficiency in bacterial cells, and the variety of libraries. The size of the libraries is reduced by improper folding of the antibody- or antigen-binding protein and inefficient production due to the presence of the stop codon. Expression in bacterial cells may be inhibited by improper folding of the antibody- or antigen-binding domain. The expression can be improved by alternately mutating residues on the surface of the variable/constant interfaces or the selected CDR residues. The sequence of the framework region is an element that enables proper folding when generating antibody phage libraries in bacterial cells.

It is important to generate various libraries of antibody- or antigen-binding proteins in the separation of high-affinity antibodies. CDR3 regions have often been found to participate in antigen binding. Since the CDR3 region in the heavy chain varies considerably in terms of size, sequence and structural/dimensional morphology, various libraries can be produced using the same.

Also, diversity can be created by randomizing the CDR regions of variable heavy and light chains using all 20 amino acids at each position. The use of all 20 amino acids results in the production of antibody sequences having increased diversity and an increased chance of identifying new antibodies.

The antibody or antibody fragment of the present invention may include the sequence of the anti-TIE2 antibody mentioned herein as well as biological equivalents thereto, as long as it can specifically recognize TIE2. For example, additional variations can be made to the amino acid sequence of the antibody in order to further improve the binding affinity and/or other biological properties of the antibody. Such variations include, for example, deletion, insertion and/or substitution of the amino acid sequence residues of the antibody. Such amino acid variations are based on the relative similarity of amino acid side chain substituents, such as the hydrophobicity, hydrophilicity, charge and size thereof. It can be seen through analysis of the size, shape and type of amino acid side chain substituents that all of arginine, lysine, and histidine are positively charged residues; alanine, glycine, and serine have similar sizes; and phenylalanine, tryptophan, and tyrosine have similar shapes. Thus, based on these considerations, arginine, lysine, and histidine; alanine, glycine, and serine; and phenylalanine, tryptophan, and tyrosine are considered to form respective groups of biologically functional equivalents.

Taking into consideration of variations having biologically equivalent activity, the amino acid sequence of the antibody or a nucleotide molecule encoding the same according to the present invention is interpreted to include a sequence having substantial identity with the sequence set forth in the sequence number. The term "substantial identity" means that a sequence has a homology of at least 90%, most preferably a homology of at least 95%, at least 96%, at least 97%, at least 98% or at least 99%, when aligning the sequence of the present invention with any other sequence so as to correspond to each other as closely as possible and analyzing the aligned sequence using algorithms commonly used in the art. Alignment methods for sequence comparison are well-known in the art. The NCBI Basic Local Alignment Search Tool (BLAST) is accessible through NCBI or the like, and can be used in conjunction with sequence analysis programs such as BLASTP, BLASTM, BLASTX, TBLASTN and TBLASTX over the Internet. BLAST is available at www.ncbi.nlm.nih.gov/BLAST/. A method of comparing sequence homology using this program can be found at www.ncbi.nlm.nih.gov/BLAST/blast_help.html.

Based on this, the antibody or antigen-binding fragment thereof according to the present invention can have homology of 90%, 91%, 92%, 93%, 94%, 95%, 96%, 97%, 98%, 99%, or more with the sequence disclosed herein or the entirety thereof. Homology can be determined through sequence comparison and/or alignment by methods known in the art. For example, the percentage sequence homology of the nucleic acid or protein according to the present invention can be determined using a sequence comparison algorithm (i.e., BLAST or BLAST 2.0), manual alignment, or visual inspection.

In another aspect, the present invention is directed to a nucleic acid encoding the antibody or an antigen-binding fragment thereof.

The nucleic acid may encode the heavy-chain variable region selected from the group consisting of SEQ ID NOS: 37, 41, 45, 49, 53 and 57. Alternatively, the nucleic acid may encode the light-chain variable region selected from the group consisting of SEQ ID NOS: 39, 43, 47, 51, 55 and 59.

By isolating the nucleic acid encoding the antibody or antigen-binding fragment thereof according to the present invention, an antibody or antigen-binding fragment thereof can be produced in a recombinant manner. The nucleic acid is isolated and inserted into a replicable vector, followed by further cloning (amplification of DNA) or further expression. Based on this, in another aspect, the present invention is directed to a vector including the nucleic acid.

The term "nucleic acid" is intended to encompass both DNA (gDNA and cDNA) and RNA molecules, and a nucleotide, which is the basic constituent unit of nucleic acids, includes naturally derived nucleotides as well as analogues thereof, in which sugar or base moieties are modified. The sequence of the nucleic acid encoding heavy- and light-chain variable regions of the present invention can vary. Such variation includes addition, deletion, or non-conservative or conservative substitution of nucleotides.

The DNA encoding the antibody can be easily separated or synthesized using conventional procedures (for example, using an oligonucleotide probe capable of specifically binding to DNA encoding heavy and light chains of the antibody). A variety of vectors are obtainable. Vector components generally include, but are not limited to, one or more of the following components: signal sequences, replication origins, one or more marker genes, enhancer elements, promoters, and transcription termination sequences.

As used herein, the term "vector" refers to a means for expressing target genes in host cells, and includes plasmid vectors, cosmid vectors, and viral vectors such as bacteriophage vectors, adenovirus vectors, retroviral vectors and adeno-associated viral vectors. The nucleic acid encoding the antibody in the vector is operably linked to a promoter.

The term "operably linked" means functional linkage between a nucleic acid expression regulation sequence (e.g., array of the binding site of the promoter, signal sequence or transcription regulator) and another nucleic acid sequence, and enables the regulation sequence to regulate transcription and/or translation of the other nucleic acid sequence.

When a prokaryotic cell is used as a host, it generally includes a potent promoter capable of conducting transcription (such as a tac promoter, lac promoter, lacUV5 promoter, lpp promoter, pLλ promoter, pRλ promoter, rac5 promoter, amp promoter, recA promoter, SP6 promoter, trp promoter, or T7 promoter), a ribosome-binding site for initiation of translation, and a transcription/translation termination sequence. In addition, for example, when a eukaryotic cell is used as a host, it includes a promoter derived from the genome of mammalian cells (e.g., a metallothionein promoter, a β-actin promoter, a human hemoglobin promoter or a human muscle creatine promoter), or a promoter derived from a mammalian virus (e.g., an adenovirus late promoter, vaccinia virus 7.5K promoter, SV40 promoter, cytomegalovirus (CMV) promoter, HSV tk promoter, mouse mammary tumor virus (MMTV) promoter, HIV LTR promoter, Moloney virus promoter, Epstein-Barr virus (EBV) promoter, or Rous sarcoma virus (RSV) promoter), and generally has a polyadenylation sequence as a transcription termination sequence.

Optionally, the vector may be fused with another sequence in order to facilitate purification of the antibody expressed thereby. The sequence to be fused therewith may include, for example, glutathione S-transferase (Pharmacia, USA), maltose-binding protein (NEB, USA), FLAG (IBI, USA), 6×His (hexahistidine; Qiagen, USA) and the like.

The vector includes antibiotic-resistant genes commonly used in the art as selectable markers, and examples thereof include genes conferring resistance to ampicillin, gentamycin, carbenicillin, chloramphenicol, streptomycin, kanamycin, geneticin, neomycin and tetracycline.

In another aspect, the present invention is directed to a cell comprising the above-mentioned vector, which is transformed with the above-mentioned vector. The cell used to produce the antibody of the present invention may be a prokaryote, yeast or higher eukaryotic cell, but is not limited thereto.

Prokaryotic host cells such as *Escherichia coli*, strains of the genus *Bacillus*, such as *Bacillus subtilis* and *Bacillus thuringiensis*, *Streptomyces* spp., *Pseudomonas* spp. (for example, *Pseudomonas putida*), *Proteus mirabilis* and *Staphylococcus* spp. (for example, *Staphylococcus carnosus*) may be used.

Interest in animal cells is the greatest, and examples of useful host cell lines include, but are not limited to, COS-7, BHK, CHO, CHOK1, DXB-11, DG-44, CHO/–DHFR, CV1, COS-7, HEK293, BHK, TM4, VERO, HELA, MDCK, BRL 3A, W138, Hep G2, SK-Hep, MMT, TRI, MRC 5, FS4, 3T3, RIN, A549, PC12, K562, PER.C6, SP2/0, NS-0, U20S, and HT1080.

In another aspect, the present invention is directed to a method of producing the antibody or antigen-binding fragment thereof including: (a) culturing the cell; and (b) recovering an antibody or antigen-binding fragment thereof from the cultured cell.

The cells can be cultured in various media. Any commercially available medium can be used as a culture medium without limitation. All other essential supplements well-known to those skilled in the art may be included in appropriate concentrations. Culture conditions such as temperature and pH are conventionally used with host cells selected for expression, as will be apparent to those skilled in the art.

The recovery of the antibody or antigen-binding fragment thereof can be carried out, for example, by centrifugation or ultrafiltration to remove impurities and purification of the resulting product using, for example, affinity chromatography. Other additional purification techniques, such as anion or cation exchange chromatography, hydrophobic interaction chromatography, and hydroxyapatite (HA) chromatography, may be used.

In another aspect, the present invention is directed to a composition for preventing or treating an angiogenesis-related disease containing the antibody or antigen-binding fragment thereof as an active ingredient.

The angiogenesis refers to a phenomenon in which new blood vessels are formed or grown from previously existing blood vessels, and the term "angiogenesis-related disease" refers to a disease related to the occurrence or progression of angiogenesis. Any disease may fall within the scope of the angiogenesis-related disease without limitation, as long as it can be treated with the antibody. Examples of the angiogenesis-related disease include, but are not limited to, cancer, metastasis of cancer, diabetic retinopathy, retinopathy of prematurity, corneal graft rejection, macular degeneration, neovascular glaucoma, erythrosis, proliferative retinopathy, psoriasis, hemophilic arthritis, capillary formation of atherosclerotic plaques, keloid, wound granulation, vascular adhesion, rheumatoid arthritis, osteoarthritis, autoimmune diseases, Crohn's disease, restenosis, atherosclerosis, intestinal adhesions, cat-scratch diseases, ulcers, liver cirrhosis, nephritis, diabetic nephropathy, diabetic foot ulcers, chronic kidney failure, diabetes mellitus, inflammatory diseases, idiopathic pulmonary fibrosis, sepsis, acute respiratory distress syndrome, and neurodegenerative diseases.

In addition, the cancer is selected from the group consisting of esophageal cancer, stomach cancer, large intestine cancer, rectal cancer, oral cancer, pharyngeal cancer, laryngeal cancer, lung cancer, colon cancer, breast cancer, uterine cervical cancer, endometrial cancer, ovarian cancer, prostate cancer, testicular cancer, bladder cancer, renal cancer, liver cancer, pancreatic cancer, bone cancer, connective tissue cancer, skin cancer, brain cancer, thyroid cancer, leukemia, Hodgkin's lymphoma, lymphoma and multiple myeloid blood cancer, but is not limited thereto.

As used herein, the term "prevention or prophylaxis" refers to any action that suppresses or delays the onset of a disease of interest through administration of the antibody or composition according to the present invention. The term "treatment or therapy" refers to any action that alleviates or positively alters the symptoms of a disease of interest through administration of the antibody or composition.

In another aspect, the present invention is directed to a composition for stabilizing a blood vessel containing the antibody or an antigen-binding fragment thereof as an active ingredient.

As used herein, the term "vascular stabilization" means a property of blood vessels to maintain the function thereof through alleviation, relief or elimination of factors that may impair the integrity of blood vessels, or inhibition, alleviation or elimination of damage to blood vessels. Specifically, "vascular stabilization" may include inhibition of permeation of blood vessels, inhibition of blood vessel damage, and/or restoration of integrity of damaged blood vessels.

The composition containing the antibody of the present invention is preferably a pharmaceutical composition, and may further contain an appropriate vehicle, excipient or diluent typically used in the art.

The pharmaceutical composition containing pharmaceutically acceptable vehicles may be any of a variety of oral or parenteral dosage forms such as tablets, pills, powders, granules, capsules, suspensions, oral solutions, emulsions, syrups, sterile aqueous solutions, non-aqueous solutions, suspensions, lyophilizates and suppositories. In this regard, the pharmaceutical composition of the present invention may be formulated in combination with a diluent or excipient such as a filler, a thickener, a binder, a wetting agent, a disintegrant, a surfactant, and the like. Solid preparations for oral administration may be in the form of tablets, pills, powders, granules, capsules, and the like. These solid formulations may be prepared by combining the compound of the present invention with at least one excipient such as starch, calcium carbonate, sucrose, lactose, or gelatin. Simple excipients, lubricants such as magnesium stearate, talc, and the like may further be used. Liquid formulations for oral administration may be suspensions, oral solutions, emulsions, syrups, and the like. The liquid formulations may be prepared by incorporating various excipients such as simple diluents, for example, water or liquid paraffin, wetting agents, sweeteners, aromatics, preservatives and the like. In addition, the pharmaceutical composition of the present invention may be a parenteral formulation such as a sterile aqueous solution, a non-aqueous solvent, a suspension, an emulsion, a lyophilizate, a suppository or the like. Injectable propylene glycol, polyethylene glycol, vegetable oils such as olive oil and esters such as ethyl oleate may be suitable for non-aqueous solvents and suspensions. The basic substance of a suppository may include Witepsol, macrogol, Tween 61, cacao butter, laurin butter and glycerogelatin.

The pharmaceutical composition according to the present invention may be administered in a pharmaceutically effective amount, and the term "pharmaceutically effective amount" refers to an amount sufficient for treating a disease at a reasonable benefit/risk ratio applicable to all medical treatments. The effective amount may vary depending on a variety of factors including severity of the disease to be treated, age and gender of the patient, the type of the disease, activity of the drug, sensitivity of the patient to the drug, the administration time, administration route, excretion rate, the treatment period, co-administration of drugs, and other factors well-known in the pharmaceutical field. In addition, the composition of the present invention may be administered alone or in combination with other therapeutics. In this case, the composition may be administered sequentially or simultaneously with conventional therapeutics. In addition, the composition may be administered in single or multiple doses. Taking into consideration these factors, it is important to administer the composition in the minimum amount sufficient to achieve maximum efficacy without side effects. In addition, the amount of the composition that is administered may be determined by those skilled in the art. The dosage of the pharmaceutical composition according to the present invention is not particularly limited, and is changed depending on a variety of factors including the health condition and weight of the patient, the severity of the disease, the type of drug, administration route, and administration time. The composition may be administered to mammals including rats, rats, livestock, humans and the like in single or multiple doses daily via a typically acceptable route, e.g., orally, rectally, intravenously, subcutaneously, intrauterinely, or intracerebrovascularly.

In another aspect, the present invention is directed to a method for inhibiting angiogenesis and a method for preventing or treating an angiogenesis-related disease including administering the antibody or the composition to a subject in need thereof.

The method of the present invention includes administering a pharmaceutically effective amount of the pharmaceutical composition to a subject in need of inhibition of angiogenesis. The subject may be a mammal such as a dog, cow, horse, rabbit, mouse, rat, chicken, or human, but is not limited thereto. The pharmaceutical composition may be administered via a suitable route including parenteral, subcutaneous, intraperitoneal, intrapulmonary or intranasal routes, including, if necessary, intralesional administration for topical treatment. The preferred dosage of the pharmaceutical composition of the present invention may vary depending on various factors including the health condition and weight of the subject, the severity of the disease, the type of drug, the route of administration and the time of administration, and may be easily determined by a person skilled in the art.

In another aspect, the present invention is directed to a pharmaceutical composition for preventing or treating cancer containing the antibody, or a method for preventing or treating cancer including administering the antibody or the composition to a subject in need thereof. The terms "antibody", "prevention" and "treatment" are as defined above.

Any cancer may be the target of treatment without limitation, as long as it can be treated with the antibody. Specifically, the antibody of the present invention can prevent the occurrence or progression of cancer by inhibiting angiogenesis. Examples of the cancer include, but are not limited to, esophageal cancer, stomach cancer, large intestine cancer, rectal cancer, oral cancer, pharyngeal cancer, laryngeal cancer, lung cancer, colon cancer, breast cancer, uterine cervical cancer, endometrial cancer, ovarian cancer, prostate cancer, testicular cancer, bladder cancer, renal cancer, liver cancer, pancreatic cancer, bone cancer, connective tissue cancer, skin cancer, brain cancer, thyroid cancer, leukemia, Hodgkin's lymphoma, lymphoma and multiple myeloid blood cancer.

In addition, the antibody of the present invention can be used in combination with other antibodies or biologically active agents or substances for various purposes. In this aspect, the present invention is directed to a composition for combined administration with another therapeutic agent for angiogenesis, the composition containing the antibody or antigen-binding fragment thereof.

The other therapeutic agent for angiogenesis diseases includes anti-angiogenic drugs, anti-inflammatory drugs, and/or anticancer drugs. These therapeutic agents can overcome resistance therebetween and increase efficacy.

When the composition according to the present invention is administered in combination with other therapeutic agents for angiogenesis diseases, the TIE2 antibody and other therapeutic agent for angiogenesis diseases may be administered sequentially or simultaneously. For example, the anti-angiogenic drug, anti-inflammatory drug and/or anticancer drug is administered to a subject, and then a composition containing an anti-TIE2 antibody or an antigen-binding fragment thereof as an active ingredient is administered to the subject, or the composition is administered to a subject, and then an anti-angiogenic drug, anti-inflammatory drug and/or anticancer drug is administered to the subject. In some cases, the composition may be administered to the subject simultaneously along with the anti-angiogenic drug, anti-inflammatory drug and/or anti-cancer drug.

In another aspect, the present invention is directed to a composition for diagnosing an angiogenesis-related disease containing the antibody or an antigen-binding fragment thereof as an active ingredient. The present invention is directed to a method of diagnosing an angiogenesis-related disease in a subject by treating the subject with the antibody or an antigen-binding fragment thereof.

The angiogenesis-related disease can be diagnosed by measuring the level of TIE2 expression in a sample through the antibody or antigen-binding fragment thereof. The level of expression can be measured using the antibody according to a conventional immunoassay method, such as radioimmunoassay, radioimmunoprecipitation, immunoprecipitation, immunohistochemical staining, enzyme-linked immunosorbent assay (ELISA), captured-ELISA, inhibition or competition analysis, sandwich analysis, flow cytometry, immunofluorescent staining, and immunoaffinity purification, but is not limited thereto.

The cancer may be diagnosed by analyzing the intensity of the final signal during the immunoassay process. That is, when the protein of a marker according to the present invention is highly expressed in a biological sample to generate a stronger signal than that of a normal biological sample (e.g., normal gastric tissue, blood, plasma, or serum), cancer is diagnosed.

In another aspect, the present invention is directed to a kit for diagnosing cancer including the composition for diagnosing cancer. The kit according to the present invention includes the anti-TIE2 antibody, and can diagnose cancer by analyzing a signal generated at the time of a reaction between a sample and the antibody. In this case, the signal may include an enzyme linked to the antibody, such as alkaline phosphatase, R-galactosidase, horseradish peroxidase, luciferase, or cytochrome P450, but is not limited thereto. In this case, when alkaline phosphatase is used as the enzyme, bromochloroindolyl phosphate (BCIP), nitroblue tetrazolium (NBT), naphthol-AS-B1-phosphate or enhanced chemifluorescence (ECF) is used a substrate for the color reaction, and when horseradish peroxidase is used as the enzyme, chloronaphthol, aminoethylcarbazole, diaminobenzidine, D-luciferin, lucigenin (bis-N-methylacridinium nitrate), resorufin benzyl ether, luminol, Amplex Red reagent (10-acetyl-3,7-dihydroxyphenoxazine), HYR (p-phenylenediamine-HCl and pyrocatechol), TMB (tetramethylbenzidine), ABTS (2,2'-Azine-di[3-ethylbenzthiazoline sulfonate]), o-phenylenediamine (OPD), naphthol/pyronine, glucose oxidase, t-NBT (nitroblue tetrazolium) and m-PMS (phenazine methosulfate) may be used as the substrate, but the present invention is not limited thereto.

In addition, the kit according to the present invention may also include a label for generating a detectable signal, and the label may include a chemical (e.g., biotin), an enzyme (alkaline phosphatase, β-galactosidase, horseradish peroxidase and cytochrome P450), a radioactive substance (such as C14, 1125, P32 and S35), a fluorescent substance (such as fluorescein), a luminescent substance, a chemiluminescent substance, and FRET (fluorescence resonance energy transfer), but is not limited thereto.

Measurement of the activity of the enzyme used for angiogenesis diagnosis or measurement of the signal can be carried out by a variety of methods known in the art. Thus, TIE2 expression can be qualitatively or quantitatively analyzed.

EXAMPLE

Hereinafter, the present invention will be described in more detail with reference to examples. However, it will be obvious to those skilled in the art that these examples are provided only for illustration of the present invention, and should not be construed as limiting the scope of the present invention.

Example 1. Screening of Antibodies Binding to TIE2

Human naive ScFv (scFv) libraries disclosed in Korean Patent Laid-Open Publication No. 10-2008-0109417 were used for screening antibodies binding to TIE2 and preparation of the libraries. 100 μl of an antigen (hTIE2-his: Sino Biological, 10700-H08H) was plated at 2 μl/ml onto a 96-well Ni$^+$ plate and incubated for 4° C. overnight. The next day, the antigen-coated plate was washed three times with 0.1% TBST, and was then reacted with 200 μl of 2% BSA blocking buffer at room temperature for 2 hours. 50 μl of XL1-Blue stock was added to 2 ml of 2×YT-TET (tetracycline 10 μg/ml) growth medium and incubated at 37° C. for 2 hours at 200 rpm, and 13 ml thereof was further added and incubated until OD$_{600}$ reached 0.5. After blocking for 2 hours, the well was washed 3 times with 1×PBS. The phage library group was combined with each washed well, the phage library and 4% BSA were mixed in equal amounts, and then 200 μl of the mixture was added thereto, followed by allowing a reaction to proceed at room temperature for 2.5 hours. After the phage library reaction was completed, the supernatant was discarded, the residue was washed 5 times with 0.1% TBST and washed 3 times with TBS, 100 μl of 100 mM TEA (trimethylamine) was added to each well, and the resulting mixture was shaken at room temperature for 10 minutes. After 10 minutes, 50 μl of 1M Tris (pH 7.5) was added to each well, followed by mixing. The supernatant was added to 10 ml of XL1-blue having OD$_{600}$ of 0.5 to induce infection at 37° C. for 30 minutes. After infection was completed, 100 μl was used as an output titer, and the residue was centrifuged at 6,000 rpm for 10 minutes. The supernatant was discarded, and the precipitate was spread over a large square plate (CM 34 μg/ml+1% glucose) and incubated at 30° C. overnight. The 100 μl left as the output titer was diluted to 1/10, 1/100, and 1/1000, spread on a CM plate, and incubated at 37° C. overnight. The next day, colonies that had grown on the square plate were scraped using a loop after the addition of 50 ml of 2×YT medium thereto and centrifuged at 6,000 rpm for 10 minutes, after which the supernatant was discarded and the precipitate was used to prepare a primary panning stock. 100 ml of a 2×YT culture medium (growth medium: CM 34 μg/ml+1% glucose) was placed in a 500 ml Erlenmeyer flask, and cells were added thereto to adjust the $OD_{600}$ to 0.2 and grown under conditions of 200 rpm and 37° C. until the $OD_{600}$ reached 0.5. After the cells were cultured until the $OD_{600}$ reached 0.5, a helper phage (M13KO7 mutant) was added in an amount 20 times that of the cells. After infection with the helper phage at 37° C. for 30 minutes, centrifugation was performed at 6,000 rpm for 10 minutes. The supernatant was discarded and the cells were incubated overnight in 100 ml of a fresh 2×YT medium (CM 34 μg/ml+Kan. 70 μg/ml+1 mM IPTG+5 mM $MgCl_2$) at 200 rpm and 30° C. The next day, the grown cells were centrifuged at 7,000 rpm for 10 minutes and centrifuged once more in the same manner as above. The collected supernatant was precipitated on ice in the presence of 20% PEG/2.5M NaCl in an amount of 1/5 (v/v) of that of the supernatant for 1 hour. After precipitation, centrifugation was performed at 9,000 rpm for 1 hour. The supernatant was discarded, and the precipitate was released with 3 ml of TBS, filtered through a 0.45 μm filter, stored at 4° C., and used in the next panning process. This process was repeated 3 to 4 times, and the antibody binding to the antigen was identified through ELISA.

Example 2. Screening of Monoclonal ScFv Phage Binding Specifically to TIE2 and Neutralizing the Binding to TIE2 (Binding ELISA)

After the panning process was completed, the final round cell stock was diluted to form 200 to 500 colonies, spread on a CM agar plate, and then incubated overnight at 37° C. The next day, when the colonies grew, 200 μl of 2×YT medium (CM 34 μg/ml+1% glucose) was added to a 96-well deep plate, one colony was inserted into each well, and the plate was then incubated overnight at 37° C. and 3,000 rpm. The next day, 200 μl of 2×YT medium (CM 34 μg/ml+1% glucose) was plated onto a fresh 96-well deep plate, and 20 ml of the cells that had grown the day before were injected into each well and grown at 37° C. and 3,000 rpm for 1 hour and 10 minutes. The remaining cells were stored at −70° C. in 100 μl of 50% glycerol. When the cells grew, 1 μl of a helper phage was mixed with 19 μl of 2×YT medium, and 20 μl of the resulting mixture was injected into each well and incubated for 30 minutes at 37° C. After incubation, centrifugation was performed at 3,000 rpm for 10 minutes. The supernatant was discarded and 200 μl of 2×YT medium (CM 34 μg/ml+Kan. 70 μg/ml, +1 mM IPTG+5 mM $MgCl_2$) was added to the residue, followed by incubation in MegaGrow at 30° C. and 3,000 rpm overnight.

In order to select phages that specifically bind to TIE2, first, 2 μg/ml of Ag (hTIE2-his: Sino Biological, 10700-H08H) was plated at 100 μl/well onto a 96-well $Ni^+$ plate and then incubated at 4° C. overnight. The next day, the cells grown the day before were centrifuged at 3,000 rpm for 10 minutes and stored at 4° C. The plated Ag was washed 3 times with 0.1% TBST, and then 200 μl of 2% BSA blocking buffer was added thereto, followed by incubation at 25° C. for 2 hours. After blocking was completed, the result was washed 3 times with 0.1% TBST. In each well, 50 μl of 4% BSA was mixed with 50 μl of the phage stored at a down-regulated temperature of 4° C., and reaction therebetween was allowed to proceed while being shaken at room temperature for 1 hour. After phage binding was completed, the reaction product was washed three times with 0.1% TBST, 100 μl of HRP-conjugated mouse anti-M13 antibody (1:3000, Sino, 11973-MM05)) was added thereto, and reaction was allowed to proceed at 25° C. for 1 hour. After the reaction was completed, the resulting product was washed 3 times with 0.1% TBST, 100 μl of TMB (#BD TMB substrate reagent set 555214) was added thereto, color was developed for 3 to 5 minutes, 50 μl of a stop solution was added thereto, and then an assay was performed using an ELISA reader.

The following Table 1 shows the result of measurement of the monoclonal scFv phage specifically binding to the TIE2 antigen by ELISA, and the following Tables 2 and 3 show the nucleotide sequences of the selected antibodies.

TABLE 1

Result of measurement of the monoclonal scFv phage specifically binding to TIE2 antigen by ELISA

| No. | Clone number | Human ELISA | Mouse ELISA |
|---|---|---|---|
| 1 | 1A6 | 2.1 | 0.1 |
| 2 | 1A9 | 2.4 | 0.0 |
| 3 | 2F2 | 1.9 | 0.1 |
| 4 | 3D6 | 2.1 | 0.1 |
| 5 | 4 E2 | 1.2 | 0.4 |

TABLE 2

CDR sequences of antibodies specifically binding to TIE2 antigen

| | | Sequence name | Amino acid sequence | |
|---|---|---|---|---|
| No. 1 | 1A6 | Heavy-chain CDR1 | GFTFSSYA | 1 |
| | | Heavy-chain CDR2 | ISGSGGST | 2 |
| | | Heavy-chain CDR3 | ARGVDSSMVTGFDH | 3 |
| | | Light-chain CDR1 | QSISRW | 4 |
| | | Light-chain CDR2 | EAS | 5 |
| | | Light-chain CDR3 | QQYEDYPLT | 6 |
| No. 2 | 1A9 | Heavy-chain CDR1 | GYTFNSYD | 7 |
| | | Heavy-chain CDR2 | VNPPGGTGST | 8 |
| | | Heavy-chain CDR3 | ARDYNRAPPTLDV | 9 |
| | | Light-chain CDR1 | SSSDVGGYNY | 10 |
| | | Light-chain CDR2 | DVT | 11 |
| | | Light-chain CDR3 | SSYSSSTFYV | 12 |
| No. 3 | 2F2 | Heavy-chain CDR1 | GFTFSSYA | 13 |
| | | Heavy-chain CDR2 | ISGSGGST | 14 |
| | | Heavy-chain CDR3 | ARGGLHHGFDI | 15 |
| | | Light-chain CDR1 | NIESKS | 16 |
| | | Light-chain CDR2 | YDN | 17 |
| | | Light-chain CDR3 | QVWDTYTDQPV | 18 |
| No. 4 | 3D6 | Heavy-chain CDR1 | GFTFSRYN | 19 |
| | | Heavy-chain CDR2 | ISSSGRFI | 20 |
| | | Heavy-chain CDR3 | ARDSPTQGPYYYYGMDV | 21 |
| | | Light-chain CDR1 | KIGSKS | 22 |
| | | Light-chain CDR2 | YDS | 23 |
| | | Light-chain CDR3 | QVWDSSSDRPV | 24 |
| No. 5 | 4E2 | Heavy-chain CDR1 | GFTFSDYA | 25 |
| | | Heavy-chain CDR2 | ISFDGNNQ | 26 |
| | | Heavy-chain CDR3 | TTDTMSGYDWEDAFDI | 27 |
| | | Light-chain CDR1 | QSIGRW | 28 |
| | | Light-chain CDR2 | ASS | 29 |
| | | Light-chain CDR3 | QQSYSTPYT | 30 |
| No. 6 | 11F | Heavy-chain CDR1 | GFSFSDHA | 31 |
| | | Heavy-chain CDR2 | VWPDGSNK | 32 |
| | | Heavy-chain CDR3 | ARDSGPISRGDLTY | 33 |
| | | Light-chain CDR1 | GGSIASNY | 34 |
| | | Light-chain CDR2 | EDD | 35 |
| | | Light-chain CDR3 | QSYDDTNVV | 36 |

TABLE 3

Variable region sequences of antibodies specifically binding to TIE2 antigen

| | Antibody name | | Sequence | SEQ ID NO. |
|---|---|---|---|---|
| No. 1 | 1A6 | Heavy-chain variable region | CAGGTGCAGCTGGTGGAGTCCGGG GGAGGCTTGGTTCAGCCTGGGGGG TCCCTGAGACTCTCCTGTGCAGCCT CTGGATTCACCTTTAGCAGCTATGC CATGAGCTGGGTCCGCCAGGCTCC AGGGAAGGGGCTGGAGTGGGTCTC AGCTATTAGTGGTAGTGGTGGTAG CACATACTACGCAGACTCCGTGAA GGGCCGGTTCACCATCTCCAGAGA CAATTCCAAGAACACGCTGTATCT GCAAATGAACAGTCTGAGAGCCGA AGACACGGCCGTGTATTACTGTGC GAGAGGCGTGGATTCTTCTATGGT AACCGGATTTGATCACTGGGGCCA GGGAACTTTGATCACCGTCTCCTCA | 37 |
| | | | QVQLVESGGGLVQPGGSLRLSCAAS GFTFSSYAMSWVRQAPGKGLEWVS AISGSGGSTYYADSVKGRFTISRDNS KNTLYLQMNSLRAEDTAVYYCARG VDSSMVTGFDHWGQGTLITVSS | 38 |
| | | Light-chain variable region | GACATCCAGATGACCCAGTCTCCTT CCACCCTGTCTGCATCTGTAGGAGA CAGAGTCACCATCACTTGCCGGGC CAGTCAGAGTATTAGTAGGTGGTT GGCCTGGTATCAGCAGAAACCAGG GAAAGCCCCTAAGTTCCTGATCTAT GAGGCATCTACTTTAGAAAGTGGG GTCCCATCAAGGTTCAGCGGCAGT GGAACTGGGACAGAATTCACTCTC ACCATCAGCAGCCTGCAGCCTGAT GATTTTGCTACTTATTACTGTCAAC AGTATGAGGACTACCCGCTCACCTT CGGCCAAGGGACACGACTGGAAAT CAAACGT | 39 |
| | | | DIQMTQSPSTLSASVGDRVTITCRAS QSISRQLAWYQQKPGKAPKFLIYEA STLESGVPSRFSGSGTGTEFTLTISSL QPDDFATYYCQQYEDYPLTFGQGTR LEIKR | 40 |
| No. 2 | 1A9 | Heavy-chain variable region | CAGATGCAGCTGGTACAGTCTGAG GCTGAGGTGAAGAAGCCTGGGGCC TCAGTGAAGGTTTCCTGTAAGGCAT CTGGATACACCTTTAACAGTTACGA TATACACTGGGTGCGACAGGCCCC TGGACAAGGGCTTGAGTGGATGGG AGTAGTCAACCCACCTGGTGGAAC CGGAAGCACTGTTTACGCACAGAA GTTCGAGGACAGACTCACCCTGAC CACGGACATGTCCACAAGCACAGC CTACATGGAGCTGAGCAGCCTGAG ATCTGAGGACACGGCCGTGTATTA CTGTGCAAGAGACTATAATAGGGC CCCGCCTACTTTGGACGTCTGGGGC CAAGGGACCACGATCACCGTCTCC TCA | 41 |
| | | | QMQLVQSEAEVKKPGASVKVSCKA SGYTFNSYDIHWVRQAPGQGLEWM GVVNPPGGTGSTVYAQKFEDRLTLT TDMSTSTAYMELSSLRSEDTAVYYC ARDYNRAPPTLDVWGQGTTITVSS | 42 |
| | | Light-chain variable region | AATTTATGCTGACTCAGCCCGCCT CCGTGTCTGGGTCCCTGGACAGTC GATCACCATCTCCTGCACTGGAAG CAGCAGCGACGTTGGTGGTTATAA CTATGTCTCCTGGTACCAACAGCAC CCAGGCAAAGCCCCCCAACTCATC ATTTATGATGTCACTAAGCGGCCCT CAGGGGTTTCTAATCGCTTCTCCGG CTCCAAGTCTGGCAACTCGGCCTCC CTGACCATCTCTGGACTCCAGGCTG AGGACGAGGCTGATTATTACTGCA GCTCATACAGCAGCAGCACTTTTTA CGTCTTCGGAACTGGGACCAAGGT | 43 |

TABLE 3-continued

Variable region sequences of antibodies specifically binding to TIE2 antigen

| Antibody name | | | Sequence | SEQ ID NO. |
|---|---|---|---|---|
| | | | CACCGTCCTAGGT | |
| | | | NFMLTQPASVSGSPGQSITISCTGSSS DVGGYNYVSWYQQHPGKAPQLIIYD VTKRPSGVSNRFSGSKSGNSASLTIS GLQAEDEADYYCSSYSSSTFYVFGT GTKVTVLG | 44 |
| No. 3 | 2F2 | Heavy-chain variable region | CAGGTGCAGCTGGTGGAGTCTGGG GGAGGCTTGGTACAGCCTGGGGGG TCCCTGAGACTCTCCTGTGCAGCCT CTGGATTCCCTTTAGCAGCTATGC CATGACCTGGGTCCGCCAGGCTCC AGGGAAGGGGCTGGAGTGGGTCTC ACGTATGASTGGTAGTGGTGGGAG CACAAACTACGCAGACTCCGTGAA GGGCCGGTTCACCATCTCCAGAGA CAATTCCAAGAACACGCTGTATCT GCAAATGAACAGTCTGAGAGCCGA GGACACGGCCGTGTATTACTGTGC AAGAGGGGTCTCCATCATGGTTTT GATATCTGGGGCCAAGGGACAATG GTCACCGTCTCCTCA | 45 |
| | | | QVQLVESGGGLVQPGGSLRLSCAAS GFTFSSYAMTWVRQAPGKGLEWVS RISGSGGSTNYADSVKGRFTISRDNS KNTLYLQMNSLRAEDTAVYYCARG GLHHGFDIWGQGTMVTVSS | 46 |
| | | Light-chain variable region | TCCTATGAGCTGACACAGCCACCCT CACTGTCAGTGGCCCCAGGGAAGA CGGCCAGGATTACATGTGACGGGG ACAACATTGAAAGTAAAAGTGTCC ACTGGTACCAGCAGAAGCCAGGCC AGGCCCCTGTGCTAGTCATCTATTA TGATAATGACCGGCCCTCAGGGAT CCCTGAGCGATTCTCTGGCTCCAAC TCTGGGAACACGGCCACCCTGACC ATCAGCAGGGTCGAAGCCGGAGAT GAGGCCGACTATTACTGTCAGGTG TGGGACACTTATACCGATCAGCCG GTATTCGGCGGAGGGACCAAGCTG ACCGTCCTAGGT | 47 |
| | | | SYELTQPPSLSVAPGKTARITCDGDNI ESKSVHWYQQKPGQAPVLVIYYDN DRPSGIPERFSGSNSGNTATLTISRVE AGDEADYYCQVWDTYTDQPVFGGG TKLTVLG | 48 |
| No. 4 | 3D6 | Heavy-chain variable region | CAGGTGCAGCTGGTAGAGTCTGGG GGAGGCTTGGTACAGCCTGGGGGG TCCCTGAGACTCTCCTGTATAGGCT CTGGCTTCACCTTCAGTCGCTATAA CATAAATTGGGTCCGCCAGGCTCC AGGGAAGGGCCTGGAGTGGGTCTC ATCCATTAGTAGTAGTGGAAGGTT CATCCACTACGCAGGCTCAGTGAA GGGCCGATTCACCGTCTCCAGAGA CAACACCAAGAACTCAGTGTCTCT ACAAATGAACAGTCTGAGAGCCGA GGACACGGCCGTGTATTACTGTGC GAGAGACTCTCCAACACAGGGCCC CTACTACTACTACGGTATGGACGTC TGGGGCCAAGGGACCACGATCACC GTCTCCTCA | 49 |
| | | | QVQLVESGGGLVQPGGSLRLSCIGSG FTFSRYNINWVRQAPGKGLEWVSSIS SSGRFIHYAGSVKGRFTVSRDNTKNS VSLQMNSLRAEDTAVYYCARDSPTQ GPYYYYGMDVWGQGTTITVSS | 50 |
| | | Light-chain variable region | TCCTATGAGCTGACACAGCCACCCT CAGAGTCAGTGGCCCCAGGGAAGA CGGCCACAATTACTTGTGGGGGAA ATAAAATTGGAAGTAAAAGTGTGC ACTGGTACCAACAGAAGCCAGGCC AGGCCCCTCTAATGGTCATCTATTA | 51 |

TABLE 3-continued

Variable region sequences of antibodies specifically binding to TIE2 antigen

| Antibody name | | | Sequence | SEQ ID NO. |
|---|---|---|---|---|
| | | | TGATAGCGACCGGCCCTCAGGGAT CCCTGAGCGATTCTCTGGCTCCAAC TCTGGGAACACGGCCACCCTGACC ATCAGCAGGGTCGAGGTCGGGGAT GAGGCCGACTATTACTGTCAGGTG TGGGATAGTAGTAGCGATCGTCCG GTGTTCGGCGGAGGGACCAAGCTG ACCGTCCTAGGT | |
| | | | SYELTQPPSESVAPGKTATITCGGNKI GSKSVHWYQQKPGQAPLMVIYYDS DRPSGIPERFSGSNSGNTATLTISRVE VGDEADYYCQVWDSSSDRPVFGGG TKLTVLG | 52 |
| No. 5 | 4E2 | Heavy-chain variable region | CAGGTGCAGCTGGTGCAGTCTGGA GGAGGCTTGATCCAGCCTGGGGGG TCCCTGAGACTCTCCTGTGCAGCCT CTGGATTCACCTTCAGTGACTATGC TATGCACTGGGTCCGCCAGGCTCCT GGCAAGGGGCTGGAGTGGGTGGCA CTCATATCTTTTGATGGGAATAATC AATACTACGCAGACTCCGTGAAGG GCCGATTCACCATCTCCAGAGACA ATTCGAAGAACACAATATATCTGC AAATGAACAGTCTGAGAGCCGAGG ACACGGCCGTGTACTACTGTACCA CAGATACGATGAGTGGCTACGATT GGGAAGATGCTTTTGATATCTGGG GCCAAGGGACAATGATCACCGTCT CCTCA | 53 |
| | | | QVQLVQSGGGLIQPGGSLRLSCAAS GFTFSDYAMHWVRQAPGKGLEWVA LISFDGNNQYYADSVKGRFTISRDNS KNTIYLQMNSLRAEDTAVYYCTTDT MSGYDWEDAFDIWGQGTMITVSS | 54 |
| | | Light-chain variable region | GACATCCAGATGACCCAGTCTCCA TCCTCCCTGTCTGCATCTATCGGCG ACAGAGTCACCATCACTTGCCGGG CCAGTCAGAGTATTGGTAGGTGGT TGGCCTGGTATCAGCAGAAACCAG GGAAAGCCCCTAAGCTCCTGATCT ATGCTGCATCCAGTTTGCAAAGTG GGGTCCCATCAAGGTTCAGTGGCA TGGGATCTGGGACAGATTTCACTCT CACCATCAGCAGTCTGCAACCTGA AGATTTTGCAACTTACTACTGTCAS CAGAGTTACAGTACCCCGTACACTT TTGGCCAAGGGACCAAGGTGGAGA TCAAACGTGGAGGAGCCAGCCTCG TG | 55 |
| | | | DIQMTQSPSSLSASIGDRVTITCRASQ SIGRWLAWYQQKPGKAPKLLIYAAS SLQSGVPSRFSGSGSGTDFTLTISSLQ PEDFATYYCQQSYSTPYTFGQGTKV EIKR | 56 |
| No. 6 | 11F | Heavy-chain variable region | CAGGTGCAGCTGGTGGAGTCTGGG GGAGGCGTGGTCCAGCCCGGGAGG TCCCTTAGACTCTCCTGTTCAGCGT CTGGATTCTCCTTCAGTGATCATGC CATGCACTGGGTCCGCCAGGCTCC AGGCAGGGGCCTAGAATGGGTGGC AACTGGTTTGGCCTGATGGAAGTAA TAAATATTATGTAGATTCTGTGAAC GGTCGATTCAGCATTTCCAGAGAC AATTCCAAGAACACAGTGTCTCTG CAAATGAACAGTCTGAGAGCCGAG GACACGGCCGTGTATTACTGTGCA CGAGATTCGGGACCTATCAGCGC GGAGATTTGACTTACTGGGGCCCG GGAGTCCTGGTCACCGTCTCCTCA | 57 |
| | | | QVQLVESGGGVVQPGRSLRLSCSAS GFSFSDHAMHWVRQAPGRGLEWVA TVWPDGSNKYYVDSVNGRFSISRDN | 58 |

TABLE 3-continued

Variable region sequences of antibodies specifically binding to TIE2 antigen

| Antibody name | Sequence | SEQ ID NO. |
|---|---|---|
| Light-chain variable region | SKNTVSLQMNSLRAEDTAVYYCAR DSGPISRGDLTYWGPGVLVTVSS AATTTTATGCTGACTCAGCCCCACT CTGTGTCGGAGTCTCCGGGGAAGA CTGTAATCATCTCCTGCACCGGCAG CGGTGGCAGCATTGCCAGCAACTA TGTGCAGTGGTACCAGCAGCGCCC GGGCAGTGCCCCCACCATTGTGAT CTATGAAGATGCAGAGACCCTC TGGGGTCCCTGATCGGTACTCTGGC TCCACCGACAGCTCCTCCAACTCTG CCTCCCTCACCATCTCTGGACTGAG GGCTGAGGACGAGGCTGACTACTA CTGTCAGTCTTATGACGATACCAAT GTGGTGTTCGGCGGAGGGACCAAG CTGACCGTCCTAGGTGGAGGAGCC AGCCTCGTG | 59 |
| | NFMLTQPHSVSESPGKTVIISCTGSGG SIASNYVQWYQQRPGSAPTIVIYEDD QRPSGVPDRYSGSTDSSSNSASLTISG LRAEDEADYYCQSYDDTNVVFGGG TKLTVLG | 60 |

Example 3. Selection of Antibodies with Binding Ability to Cell-Expressing TIE2

In order to determine the binding to cell-expressing TIE2, the binding to the self-established human/mouse TIE2 over-expressing CHO-K1 cell lines (hTIE2/CHO-K1, mTIE2/CHO-K1) was measured using flow cytometry. Each cell line was maintained and cultured, hTIE2 CHO-K1 was washed with PBS, 5 mM EDTA was added thereto to obtain a cell suspension, and each cell was recovered through centrifugation. A cell suspension of 5×10$^6$ cells/mL was prepared using FACS-dedicated buffer (PBS containing 2% FBS, 0.05% sodium azide), and 100 μL of the cell suspension was dispensed into each tube. 100 μL of 2 μg/mL clones was added to each test tube and allowed to stand at 4° C. for 30 minutes to induce cell binding. The cells were washed with 2 mL of FACS buffer, 100 μL of a secondary antibody dilution (1/500, PE-conjugated anti-human IgG-Fc polyclonal antibody fragment, #A80-248PE, Bethyl Laboratories Inc. US) was added thereto, and the resulting mixture was allowed to stand at 4° C. for 20 minutes to perform fluorescent labeling. The cells were washed with 2 mL of FACS buffer and then suspended in 200 μL of FACS buffer. As positive controls for TIE2, PE anti-mouse CD202b (Tie-2, CD202) antibody (124007, Biolegend), PE anti-human CD202b (Tie2/Tek) Antibody (334205, Biolegend), PE-conjugated anti-mouse IgG polyclonal antibody (A90-139PE, Bethyl Laboratories Inc.) and a PE-conjugated anti-human IgG polyclonal antibody (A80-248PE, Bethyl Laboratories Inc.) were fluorescently labeled. The analysis was performed using FACSCalibur manufactured by BD Bioscience.

As a result, it can be seen that all the clones have excellent binding to human TIE2 expressed in the CHOK1 cell lines and that the 4E2 clone had binding ability to TIE2 in both humans and mice (FIGS. 1A and 1B).

Example 4. Anti-TIE2 Antibody Expression

Conversion of the screened scFv phage to the IgG form was performed using molecular biology techniques. Phagemid was extracted from the screened *E. Coli* clone and the variable region was amplified using a PCR technique. The amplified heavy-chain variable region was inserted into an expression vector (Invivogen, pfusess-hchg1) including the heavy-chain constant region, and the amplified light-chain variable region was inserted into an expression vector (Invivogen, pfuse2ss-hclk) including the light-chain constant region to complete DNA cloning in the form of IgG.

The transient expression of IgG was performed using an Expi293F expression system kit (Thermo Fisher Scientific, US). Expi293 cells included in the kit were subjected to suspension culture on a 125 rpm orbital shaker at 37° C. and 5% $CO_2$ using a dedicated medium. Every 3 days, the cells were passage-cultured to 3×10$^5$ cells/ml, and when an expression vector was introduced, the number of cells was adjusted to 3×10$^6$ cells/ml before use. Gene introduction was performed using, as a dedicated reagent, ExpiFectamine, and a lipid-DNA complex containing 1 μg of an expression vector DNA and 2.7 μl of ExpiFectamine with respect to 1 ml of a cell suspension was prepared and added to the cell suspension. 16 to 18 hours after the introduction, ½ of an enhancer was added to induce expression. Then, the cells were cultured under the same conditions as above for 3 to 4 days and centrifuged to obtain a supernatant containing IgG.

Example 5. Purification of Anti-TIE2 Antibody

The obtained supernatant was injected into a protein A column (GE Healthcare), and IgG was purified through affinity chromatography. After the column was equilibrated with 20 mM Tris-HCl, 50 mM NaCl, and 5 mM EDTA (pH 7.0), the supernatant was injected, washed with 50 mM Tris-HCl, 500 mM NaCl, 5 mM EDTA, and 0.2% polysorbate 20 (pH 7.0) solution, eluted with 50 mM NaCl and 0.1 M glycine-HCl (pH 3.5), and neutralized with 1 M Tris. The eluted protein was dialyzed using a MWCO 10,000 Spectra/Por dialysis membrane (Spectrum Labs, US) to replace the solvent with PBS. Then, the protein was concentrated to a desired concentration using a Vivaspin (Sartorius, DE), dispensed, and stored at −80° C.

After purification, each antibody was treated with non-reducing and reducing LDS sample buffers (Thermo Fisher Scientific) and electrophoresed using a NuPAGE System (Thermo Fisher Scientific). As a result, IgG having a total molecular weight of about 150 kDa and including a 50 kDa heavy chain and a 25 kDa light chain was obtained.

Example 6. Determination of Cross-Reactivity of Anti-TIE2 Antibody to Human and Mouse VISTA Whether or not the binding of TIE2 to the ScFv phage clone was maintained in IgG was determined through ELISA. 1 µg/ml of Ag (hTIE2-his: Sino Biological, 10700-H08H; mTIE2-his: Sino Biological, 51087-M08H) was plated at 100 µl/well onto a 96-well plate and incubated at 4° C. overnight. The next day, the cells grown the day before were centrifuged at 3,000 rpm for 10 minutes and stored at 4° C. The plated Ag was washed 3 times with 0.1% TBST and 200 µl of 2% BSA blocking buffer was added thereto, followed by incubation at 25° C. for 2 hours. After blocking was completed, the resulting product was washed 3 times with 0.1% TBST. In each well, 50 µl of 4% BSA was mixed with 50 µl of the phage stored at a down-regulated temperature of 4° C., and reaction therebetween was allowed to proceed while being shaken at room temperature for 1 hour. After phage binding, the resulting product was washed 3 times with 0.1% TBST and 100 µl of HRP-conjugated goat anti-human Ab (1:3000, Sino, 11973-MM05) was added thereto, followed by incubation at 25° C. for 1 hour. After reaction, the resulting product was washed 3 times with 0.1% TBST, 100 µl of TMB (BD TMB substrate reagent set #555214) was added thereto, color was developed for 3 to 5 minutes, 50 µl of a stop solution was added thereto, and then an assay was performed using an ELISA reader.

As a result, it can be seen that similar to ScFv, 1A6, 1A9, 2F2, 4E2 and 3D6 clones bound to human TIE2, in particular the 4E2 clone, bound to mouse TIE2 as well as human TIE2 (FIG. 2).

Example 7. Measurement of Migration Activity of Anti-TIE2 Antibody

In order to find a clone that acts as the most excellent vascular stabilizer among the anti-TIE2 antibodies, clones were screened using the migration characteristics of vascular endothelial cells, which are responsible for an early stage of the vascular normalization mechanism. Therefore, a migration assay was performed using HUVECs (human vascular endothelial cell line).

A 24-well Transwell polycarbonate insert (8.0 µm pore size, Corning) was coated with a 0.1% gelatin solution and dried at room temperature for about 10 minutes. Each drug was diluted in 600 µL of basal medium and placed in the lower chamber. Then, an insert chamber was put into a lower chamber containing the medium, and HUVECs were inoculated at 1×10⁵ cells/100 µL into the insert chamber. After incubation at 37° C. for 4 hours, the insert chamber was washed three times in distilled water, and the cells attached to the insert chamber were stained with 0.5% crystal violet at room temperature for 10 minutes. Then, unmigrated cells inside the insert were wiped with a cotton swab, and the cells migrated from the inside of the insert chamber to the outside were imaged at a magnification of 200 using an optical microscope, and then quantified using the Image-J program (NIH).

As a result, it can be seen that the positive control, the group obtained by clustering 500 ng/mL ANG1 (R&D system, 923-AN-025) exhibited better migration than the non-clustered group, and that the negative control, 500 ng/mL ANG2 (R&D system, 623-AN-025) exhibited no migration regardless of clustering. In particular, it can be seen that, among the test groups, 30 µg/mL 4E2 and 2F2 clones exhibited increased migration. 1A6, 1A9 and 11F clones exhibited a basal level of migration and 3D6 exhibited reduced migration (FIG. 3A).

In order to determine the concentration-specific activity of the 4E2 and 2F2 clones and the synergistic effect of treatment in combination with Ang1 based on the results of migration, the migration activity was measured using the aforementioned method. The result showed that the 4E2 and 2F2 clones exhibited concentration-dependent activity and exhibited a synergistic effect when treated in combination with Ang1 (FIGS. 3B and 3C). Therefore, 4E2 and 2F2 clones exhibited a synergistic effect in combination with ANG1 and rapidly induced migration occurring in the early stage of vessel normalization, thus exhibiting excellent vascular stabilization.

Example 8. Comparison of Binding Properties Between Anti-TIE2 Antibodies and Competitive Materials (Ang1 & Ang2)

Whether or not 2F2 and 4E2, which are antibodies selected as vascular stabilizers by migration assay, bind competitively with Ang1 and Ang2, when binding to TIE2 and perform functions thereof, was determined through competitive ELISA. 1 µg/mL of hTIE2 (Sino Biological, 10700-H08H) was plated at a concentration of 100 µL/well on a 96-well immune plate and incubated at 4° C. overnight. The plated hTIE2 was washed twice with 1×PBS, and 200 µL of 2% BSA (blocking buffer) was added to each well, followed by incubation at RT for 2 hours. After blocking, the cells were washed twice with 0.1% PBST. Anti-TIE2 candidate antibodies and ANG1 and ANG2 proteins were bound to TIE2 through 10× serial dilution at a concentration of 2 µg/mL and at the highest concentration of 50 µg/mL, respectively. After washing three times with PBST, 100 µL of HRP-conjugated goat anti-human antibody (HRP-conjugated goat anti-human Ab) (1:3000, Sino, 11973-MM05) diluted at a ratio of 1:2000 was added at room temperature, and reaction was performed for 1 hour to induce binding, the resulting product was washed with PBST three times, and color development was performed using a TBM substrate reagent. The color development reaction was stopped through addition of 50 µL of 2N $H_2SO_4$, and specific absorbance $OD_{450-630}$ was measured using a sunrise microplate reader (TECAN, CH).

As can be seen from FIG. 2, the selected antibodies (2F2 and 4E2) bound to TIE2 without competing with human ANG1 and ANG2 (FIG. 4).

Example 9. Evaluation of Binding Affinity of Anti-TIE2 Antibodies

The affinity for human TIE2-his (Sino Biological, 10700-H08H) and mouse Tie2-his (Sino Biological, 51087-M08H) of the selected anti-TIE2 antibodies, namely 4E2, 2F2 and 11F, was analyzed using an Octet system (ForteBio Inc. US). The anti-TIE2 antibody was fixed at the biosensor and tested according to the manufacturer's manual. The binding kinetics at each concentration of human TIE2 and mouse Tie2 were measured to calculate the binding rate constant ($k_{on}$), dissociation rate constant ($k_{off}$), and binding constant ($K_D$) (Table 4).

It was found that the 11F antibody had crossreactivity between human TIE2 and mouse Tie2, and the result of ELISA showed that the 11F antibody had very weak affinity (KD: 2.09E-05 M) to the mouse Tie2. Similarly, 4E2 also bound to both human and mouse Tie2, and had high binding affinity for human TIE2, which corresponds to a KD value of 1.0E-12 M, and binding affinity for mouse Tie2 (1.38E-08 M). The 2F2 exhibited a specific high binding affinity only to human TIE2, corresponding to a KD value of 7.94E-10 M.

TABLE 4

| Sample | | KD (M) | $K_{on}$ (1/Ms) | $K_{off}$ (1/s) | Full $R^2$ |
|---|---|---|---|---|---|
| 11F | hTIE2-his | 2.76E−09 | 5.53E+04 | 1.52E−04 | 0.9986 |
|  | mTie2-his | 2.09E−05 | 1.87E+02 | 3.90E−03 | 0.8997 |
| 2F2 | hTIE2-his | 7.94E−10 | 1.46E+05 | 1.16E−04 | 0.9994 |
|  | mTie2-his | — | — | — | — |
| 4E2 | hTIE2-his | <1.0E−12 | 1.06E+05 | <1.0E−07 | 0.9949 |
|  | mTie2-His | 1.38E−08 | 2.12E+05 | 2.91 E−03 | 0.9215 |

Example 10. Measurement of Vascular Leakage Recovery Activity of Anti-TIE2 Antibody In order to determine the activity of the anti-TIE2 antibody as a vascular stabilizer, a vascular leakage recovery test was performed using vascular endothelial cells. Angiogenesis causes breakage of the junction of the vessel due to overexpression of VEGF, resulting in vascular leakage. To implement this in vitro, a vessel permeability assay was performed using a HUVEC cell line.

A 24-well Transwell polycarbonate insert (0.4 µm pore size, Merck Millipore) was coated with a 0.1% gelatin solution (Sigma Aldrich, G1890), and was then dried at room temperature for about 10 minutes. Then, an insert chamber was put into a lower chamber containing a medium, and HUVECs were inoculated at $6 \times 10^4$ cells/200 µL into the insert chamber. Then, the cells were cultured for 72 hours without medium replacement in a 5% C02 incubator at 37° C. After the medium was removed from the insert chamber, the basal medium was treated with each drug. The cells were incubated at 37° C. for 30 minutes, treated with 100 ng/mL VEGF (R&D system, 293-VE-050), and reacted for 150 minutes. Then, the insert chamber was treated with 0.5 mg/mL FITC-dextran (70 kDa, Sigma) and reacted at room temperature for 30 minutes. 50 µL of FITC-dextran discharged into the lower chamber was collected and diluted 1:20 in PBS. Then, the diluted samples were measured for fluorescence at a wavelength of 492 nm/520 nm (excitation/emission) with a microplate reader (Hidex Chameleon).

As a result, it can be seen that the group treated only with VEGF exhibited an increase in the amount of migrated FITC-dextran upon breakage of the tight junction of vascular endothelial cells. However, it can be seen that the amount of migrated FITC-dextran decreased upon treatment with Ang1, a positive control. On the other hand, Ang2, a negative control, exhibited permeability similar to that of the group treated with VEGF alone, and the group treated with 2F2 and 4E2 exhibited decreased permeability. In addition, the activity of 11F was detected in the same experimental manner as above. The result showed that 11F also decreased vessel permeability (FIGS. 5A and 5B).

The above results showed that the anti-TIE2 antibody has activity of alleviating vascular leakage induced by VEGF. In addition, whether or not the anti-TIE2 antibody can recover vascular leakage even under culture conditions similar to those of the disease model was determined in the group treated with both VEGF and Ang2.

As a result, it can be seen that 2F2 decreased vascular permeability to the basal level, and 4E2 also decreased vascular permeability to the basal level. It can be seen from the results of vessel permeability test that the 2F2 and 4E2 clones can normalize vascular leakage induced by VEGF and Ang2 (FIG. 5C).

Example 11. Research of Mechanism for Vascular Normalization of Anti-TIE2 Antibodies The TIE2 downstream signaling mechanism was evaluated to determine whether or not the vascular leakage alleviation effect of the selected anti-TIE2 antibody is accomplished by the vascular normalization signaling mechanism. For this purpose, HUVECs (human vascular endothelial cell line) were treated with drugs, and then the expression of proteins related to vascular normalization was identified through western blotting.

For western blotting, each of the HUVEC cell lines that had undergone a drug reaction was washed twice with PBS and then reacted in a lysis buffer (Thermo Scientific, RIPA buffer & phosphatase inhibitors) on ice for 20 minutes to obtain a cell extract. Then, the cells were centrifuged at 13,000 rpm and 4° C., and only the supernatant was collected. After assay using a BCA protein assay, a lysate was loaded on a 10% SDS-PAGE gel, followed by electrophoresis. The proteins were transferred to a nitrocellulose membrane (Bio-Rad) and blocked with 5% skim milk diluted in a 0.1% Tween20 TBST buffer at room temperature for 1 hour. Then, primary antibodies (p-TIE2, TIE2, p-AKT, AKT, p-ERK, ERK, p-VEGF, p-VE cadherin, VE Cadherin and Histone; Cell signaling) were diluted 1:1000 and shaken overnight at 4° C. and reacted with peroxidase-conjugate secondary antibody (Santa Cruz) diluted at 1:5000 at room temperature for 1 hour. An ECL solution (Pierce) reaction was performed, and the band of the desired protein was observed. First, the TIE2 signaling mechanism was observed at each time point. The result showed that 2F2, an anti-TIE2 antibody, induced TIE2 phosphorylation, similar to ANG1, and also phosphorylated AKT, a vessel normalization signal. It can be seen that 4E2 and 11F of the anti-TIE2 antibodies exhibited similar results. Accordingly, the 2F2, 4E2 and 11F antibodies were found to have the potential to act as vascular normalizing agents through TIE2 phosphorylation (FIG. 6).

Therefore, to determine whether or not the anti-TIE2 antibody recovered vascular leakage through vascular stabilization signaling even in a vascular leakage environment, a medium containing VEGF was treated with the anti-TIE2 antibody 2F2, and the phosphorylation signals of VEGFR and VE-Cadherin, which are responsible for tight-junction repair of vascular endothelial cells, were measured using the same western blotting method as above (FIG. 7).

As a result, it can be seen that the phosphorylation of VEGFR was increased and the phosphorylation of VE-cadherin, which constitutes cell-to-cell tight junction, was increased in the VEGF group responsible for angiogenesis. On the other hand, Ang1, a positive control, inhibited the phosphorylation of VEGFR and VE-cadherin. Likewise, 2F2 also inhibited the phosphorylation of VEGFR and VE-cadherin. In this signaling mechanism, the anti-TIE2 antibody inhibited the activation of VEGFR through TIE2 phosphorylation, and the inhibited VEGFR inhibited the phosphorylation of VE-cadherin, responsible for cell-to-cell tight junctions in the cell membrane, resulting in restoration of cell-to-cell tight junctions. The result suggested that the anti-TIE2 antibody can act as a vascular stabilizer having functions of recovering vascular leakage and of signaling.

Example 12. Maintenance of Cell-to-Cell Tight Junction by Anti-Tie2 Antibody To determine whether or not the anti-Tie2 antibody affects vascular normalization, an immunocytochemistry test was performed using a HUVEC cell line. The HUVEC cell line was seeded at a concentration of $8 \times 10^5$ cells/well in a 4-well chamber slide for ICC. After 24 hours, 100 ng/mL VEGF, Ang1, Ang2, 10 µg/mL anti-Tie2 antibodies (2F2, 4E2) were seeded and incubated for 24 hours. After fixation with 4% PFA for 15 minutes, the cell membrane was permeabilized with Triton X-100 and blocked with 10% goat serum. After washing with PBS, Alexa-488 conjugated anti-VE-cadherin (Thermo) was bound at a concentration of 1:200 overnight and reacted with 1 ng/mL DAPI for 10 minutes. After washing with PBS, the result was fixed with a mounting solution and imaged with a fluorescence microscope.

The expression of VE-Cadherin was observed. The result showed that the expression of VE-Cadherin, a cell-to-cell tight junction molecule, was reduced in the group treated with both VEGF and Ang2, and the junction was restored upon treatment with Ang1, a positive control. Upon treatment with anti-Tie2 antibody (2F2), VE-Cadherin expression was significantly increased, like the positive control, and upon treatment in combination with Ang2, VE-Cadherin expression was increased. The anti-Tie2 antibody (4E2) also exhibited a remarkable increase in VE-Cadherin expression, like the positive control, and 4E2, when treated in combination with Ang2, also exhibited an increase in VE-Cadherin expression similar to that of the single treatment group (FIG. 8A and FIG. 8B). The result showed that anti-Tie2 antibodies (2F2, 4E2) increased VE-Cadherin expression, resulting in vascular normalization.

Example 13. In-Vivo Test for Vascular Normalization of Anti-TIE2 Antibody

To determine whether or not the vascular normalization function of the anti-TIE2 antibody appears in vivo, the activity of the anti-TIE2 antibody was detected using the 4E2 antibody, which has binding ability to mouse Tie2 in a VEGF-induced vascular leakage ear model.

1% Evans blue dye was injected into the tail vein of each of 7-week-old Balb/c male mice, and reaction was allowed to proceed for 10 minutes to dye the blood blue. Then, 10 mg/kg of 4E2 was administered into blood vessels in the right ear of the mice in the test group, and PBS was administered into blood vessels in the left ear. After 30 minutes, VEGF (R&D system, 293-VE-050) was administered to blood vessels in both ears. The control group was constructed by administering PBS into the blood vessels in the left ear and administering VEGF into the right ear. After 30 minutes, the ear was cut and Evans blue dye was extracted in ethanol for 24 hours. Then, the OD value was measured using a microplate reader.

As a result, leakage of Evans blue dye was detected by VEGF in the negative control group, which corresponded to about twice the level of leakage compared to the PBS group. Among the test groups, the 4E2-treated group had an effect of reducing the leakage of Evans blue dye by about 30% compared to the VEGF group. Therefore, it can be seen from this experiment that the anti-TIE2 antibody can sufficiently normalize blood vessels exhibiting vascular leakage caused by VEGF through TIE2 signaling (FIG. 9).

Example 14. Evaluation of Function of Anti-Tie2 Antibody to Inhibit Retinal Angiogenesis To determine whether or not the anti-Tie2 antibody has an inhibitory effect against angiogenesis, a drug efficacy test was performed in a laser-induced choroidal neovascularization mouse model. The efficacy was tested in comparison with the commercial drug aflibercept as a control. After general anesthesia of the mouse using ketamine, an anesthetic eye drop was added dropwise to the eye of the mouse to induce additional local anesthesia, and a mydriatic agent was added dropwise thereto to induce mydriasis. The mouse was placed on a sacrifice table, and the Bruch's membrane was destroyed by inducing a laser burn in accordance with CNV induction conditions (wavelength of 532 nm, diameter of 50 µm, duration of 80 mS, power level of 200 mW) using a Micron-IV. Lesions where bubbling was not observed during laser burn induction were classified as unsuccessful laser burns, and were excluded from the process of analysis of results and statistical processing based on exclusion criteria constructed by modifying the criteria proposed by Gong Y. et al. (Plos One, 1:15, 2015).

24 hours after CNV induction, an anti-Tie2 antibody (20, 40 pg/eye) and a control drug aflibercept (20 pg/eye) were administered. In order to detect the angiogenesis-inhibiting effect thereof, mice were anesthetized with ketamine 10 days after CNV induction, and then a fluorescent contrast agent was injected intraperitoneally. An anesthesia eye drop was added dropwise to the eye to induce additional local anesthesia, and a mydriatic agent was added dropwise thereto to induce mydriasis. The mouse was placed on a sacrifice table, an image was focused on the fundus with the Micron-IV imaging camera, a lubricating gel was added dropwise to the eye, and the lens of the OCT was brought into contact with the cornea of the mouse. FFA/OCT imaging was performed and then an antibiotic ophthalmic drop was added to the mouse eye. Analysis of FFA and OCT images was performed using an Image-J program. However, CNV lesions corresponding to the exclusion criteria proposed by Gong Y. et al. were excluded from the final result and statistical analysis process.

To determine the effect of restoring the optic nerve, an electroretinogram (ERG) test was performed. Dark adaptation was induced in mice in the darkroom starting 12 hours before ERG evaluation. On the day of evaluation (11 days after CNV induction), the mice were subjected to general anesthesia with Rompun® and ketamine, and Alcaine® was added dropwise to the eye to induce additional local anesthesia, and a mydriatic agent was added dropwise thereto to induce mydriasis. The mouse was placed on an ERG stage, and an ERG probe was brought into contact with the tail, head and cornea. The ERG was determined as a change in retinal potential upon a single flash stimulation (0.9 log $cds/m^2$ (10 responses/intensity)). When the ERG evaluation was completed, a drop of Tobrex was added to the mouse eye. ERG analysis was performed using a LabScribeERG (iWorx DataAcquisition Software) program. However, eyes that satisfied the exclusion criteria proposed by Gong Y. et al. were excluded from the final result and statistical analysis process.

The results of evaluation of the activity of the anti-Tie2 antibody to reduce angiogenesis in the CNV mouse model are shown in FIG. 10A, FIG. 10B, and FIG. 10C. All test groups administered with the anti-Tie2 antibody exhibited a statistically significant decrease in the size of CNV lesions observed by FFA compared to the CNV control group (P<0.0001 for each group), and exhibited a much better decrease effect even compared to the test group administered with aflibercept. As can be seen from FIG. 10B, all test groups administered with the anti-Tie2 antibody exhibited a statistically significant decrease in the volume of the lesion measured by OCT compared to the CNV control group (P<0.0001, P<0.001 for each group). In addition, upon comparison of scotopic-ERG as the retinal potential with the CNV control group in FIG. 10C, a statistically significant increase in B-wave amplitude comparable to the aflibercept-administered group was observed (each, P<0.0001). The result showed that the anti-Tie2 antibody in the CNV mouse model has a function of inhibiting angiogenesis and vascular leakage.

Example 15. Evaluation of Function of Anti-Tie2 Antibody to Normalize Cancer Blood Vessels To evaluate the effect of the anti-Tie2 antibody on normalization of cancer vessels, a test was performed in a spontaneous glioblastoma mouse model using the anti-VEGFR antibody DC101 as a control drug. The degree of tumor induction in spontaneous glioblastoma was measured by IVIS imaging 6-7 week-old EGFR viii/viii Luciferase fl/+ tdTomato fl/+ mice once a week. Tumor generation was defined as a case where the IVIS signal radiance was $3.0 \times 10^4$ (photons/sec/cm$^2$/sr) or more and a locally concentrated signal was detected in the mouse brain. Mice found to have tumor generation were grouped, IVIS imaging was performed three times, specifically, once before drug administration, once during administration, and once at the end of administration, and signal radiance was recorded each time imaging. Anti-Tie2 antibody (1 mg/mouse) and anti-VEGFR antibody (1 mg/mouse) drugs were each administered intravenously in a total of 4 doses twice a week over 2 weeks. The mice were thoroughly anesthetized through respiratory anesthesia using isoflurane before drug administration. The mice were thoroughly anesthetized by IP injection of a mixed solution containing 52.5 μL of ketamine, 22.5 uL of Rompun and 75 μL of PBS. After 10 minutes, the mice were anesthetized again by IV injection of 200 μL of lectin-649 into a retro-orbital vein and then the brain was extracted. Changes in vascular structure and coverage of vascular pericytes were evaluated by staining CD31 and PDGFRβ in the extracted mouse brain.

As a result of observing the PECAM signal centering on the tumorigenic site where Td-tomato is highly expressed, the appearance characteristics of cancer vessels, such as a diameter increase, a bent shape, and remarkably reduced branches, were weakened in the 4E2-treated group compared to human IgG- and DC101-treated groups (FIG. 11A). In addition, the result of observing the PDGFRβ signal showed that most of the vascular adherent cell marker PDGFRβ protein adhered well to the PECAM-stained site in the anti-Tie2 antibody-treated group. This indicates that the anti-Tie2 antibody has a function of normalizing the appearance of cancer vessels by inhibiting abnormal proliferation of vascular endothelial cells and improving adhesion of vascular pericytes to vascular endothelial cells (FIG. 11B).

Example 16. Evaluation of Anti-Tumor Efficacy of Anti-Tie2 Antibody

To determine the antitumor effect and the effect of increasing intratumoral immune cell migration due to normalization of cancer vessels of the anti-Tie2 antibody, BALB/c mice transplanted with CT26, a mouse-derived colon cancer cell line, were administered with the anti-Tie2 antibody only and a combination thereof with an anti-mouse PD-1 antibody. The long axis, short axis and thickness of the mouse transplanted with the CT26 colorectal cancer cell line were measured using a vernier caliper. At the same time, the tumor was weighed. The size of the tumor was calculated as (long axis×short axis×thickness)/2 and tumorous mice were grouped based on an average of 27.5 mm$^3$. Then, the mice were administered with the drug of anti-Tie2 antibody (30 mg/kg) or anti-mouse PD-1 (10 mg/kg) alone and a combination thereof once a week and twice a week, respectively. On the 10$^{th}$ day after drug administration, all mice were killed using $CO_2$ gas, laparotomy was performed, the organs were visually checked for abnormalities with the naked eye, and the tumors were removed. Each extracted tumor was weighed using a chemical balance and imaged, and intratumoral immune cells such as CD4$^+$ T cells, CD8$^+$ T cells, and MDSC were measured by flow cytometry. CD8$^+$ T cells and MDSC in tumors fixed in formalin were stained using immunohistostaining.

As a result, the group treated with the anti-Tie2 antibody (10 mg/kg) alone exhibited an about 40% tumor inhibition effect and exhibited a significant reduction effect compared to the group administered with the anti-mouse PD-1 antibody (10 mg/kg) (FIGS. 12A and 12B). In particular, co-administration of anti-Tie2 antibody and anti-mouse PD-1 antibody caused a tumor inhibition effect of about 64% (FIGS. 12A and 12B). As a result of measuring the immune cells that migrated into the tumor by flow cytometry and immunohistostaining based thereon, the group administered with the anti-Tie2 antibody exhibited an about 3-fold increase in the distribution of CD8$^+$ T cells, known as cytotoxic cells, compared to the negative control group. Even co-administration with the PD-1 antibody exhibited an equivalent amount of migration (FIGS. 12C and 12D). Therefore, the anti-Tie2 antibody exhibits an anti-tumor effect by increasing the migration of immune cells into the tumor based on the function of normalizing cancer vessels.

Example 17. Evaluation of Hypoxia Alleviation of Anti-Tie2 Antibody

In order to determine the anti-tumor efficacy and alleviation of intratumoral hypoxia by the anti-Tie2 antibody through normalization of cancer vessels, the drug was administered to BALB/c mice transplanted with CT26, a mouse-derived colon cancer cell line. The tumor size, i.e., long axis, short axis and thickness, of the mouse transplanted with the CT26 colorectal cancer cell line was measured using a vernier caliper. At the same time, the tumor was weighed. The size of the mouse was calculated as (long axis×short axis×thickness)/2, and tumorous mice were grouped based on an average of 24.6 mm$^3$. Then, the mice were administered with the anti-Tie2 antibody (10 mg/kg) or an anti-VEGFR antibody, DC101 (20 mg/kg, control drug) alone once a week and twice a week, respectively. On the 10$^{th}$ day after drug administration, two animals for each group were intravenously (IV) administered with pimonidazole. After 90 minutes, all mice were killed using $CO_2$ gas, laparotomy was performed, the organs were checked for abnormalities with the naked eye, and the tumors were removed. Each extracted tumor was weighed using a chemical balance and imaged, and lymphocytes (CD4$^+$ T cells, CD8$^+$ T cells), as intratumoral immune cells, were measured through flow cytometry. The pimonidazole-administered tumor was fixed in 4% PFA and was immunohistostained using a Hypoxyprobe kit.

The anti-Tie2 antibody-administered group and the control drug DC101 exhibited similar tumor inhibition of about 30% (FIG. 13A, P<0.01, P<0.001). The anti-Tie2 antibody group exhibited an about 2-fold increase in lymphocytes, which are intratumoral immune cells, compared to the control group (FIG. 13B, P<0.01). The control drug, anti-VEGFR2 antibody, exhibited no intratumoral immune cell migration, similarly to that of the negative control group. In addition, the result of evaluating hypoxia alleviation using the Hypoxyprobe staining test method showed that the fluorescence staining intensity of the anti-Tie2 antibody-administered group was reduced by about 4 times compared to the negative control group (FIG. 13C, P<0.01), and was reduced by about 2.5 times compared to the control drug, the anti-VEGFR antibody (FIG. 13C, P<0.01). Therefore, the anti-Tie2 antibody increased the migration of immune cells in tumors and alleviated hypoxia through the function of normalizing cancer blood vessels.

INDUSTRIAL APPLICABILITY

The anti-TIE2 antibody or antigen-binding fragment thereof according to the present invention exhibits a desired binding ability to TIE2, and can be useful for the prevention or treatment of a target cancer/tumor, as a vascular stabilizer, and for the prevention or treatment of angiogenesis-related diseases. By developing a therapeutic agent having a target point different from that of a conventional therapeutic agent targeting TIE2 according to the present invention, combination therapy with a conventional therapeutic agent and single therapy for the treatment of tumors and angiogenesis-related diseases can be provided.

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

SEQUENCE LISTING FREE TEXT

An electronic file is attached.

The invention claimed is:

1. An antibody or an antigen-binding fragment thereof specifically binding to TIE-2 (tyrosine-protein kinase receptor) comprising:

a heavy-chain variable region comprising a heavy-chain CDR1 of SEQ ID NO: 1, a heavy-chain CDR2 of SEQ ID NO: 2 and a heavy-chain CDR3 of SEQ ID NO: 3, and a light-chain variable region comprising a light-chain CDR1 of SEQ ID NO: 4, a light-chain CDR2 of SEQ ID NO: 5 and a light-chain CDR3 of SEQ ID NO: 6;

a heavy-chain variable region comprising a heavy-chain CDR1 of SEQ ID NO: 7, a heavy-chain CDR2 of SEQ ID NO: 8 and a heavy-chain CDR3 of SEQ ID NO: 9, and a light-chain variable region comprising a light-chain CDR1 of SEQ ID NO: 10, a light-chain CDR2 of SEQ ID NO: 11, and a light-chain CDR3 of SEQ ID NO: 12;

a heavy-chain variable region comprising a heavy-chain CDR1 of SEQ ID NO: 13, a heavy-chain CDR2 of SEQ ID NO: 14 and a heavy-chain CDR3 of SEQ ID NO: 15, and a light-chain variable region comprising a light-chain CDR1 of SEQ ID NO: 16, a light-chain CDR2 of SEQ ID NO: 17, and a light-chain CDR3 of SEQ ID NO: 18;

a heavy-chain variable region comprising a heavy-chain CDR1 of SEQ ID NO: 19, a heavy-chain CDR2 of SEQ ID NO: 20 and a heavy-chain CDR3 of SEQ ID NO:

21, and a light-chain variable region comprising a light-chain CDR1 of SEQ ID NO: 22, a light-chain CDR2 of SEQ ID NO: 23, and a light-chain CDR3 of SEQ ID NO: 24;
a heavy-chain variable region comprising a heavy-chain CDR1 of SEQ ID NO: 25, a heavy-chain CDR2 of SEQ ID NO: 26 and a heavy-chain CDR3 of SEQ ID NO: 27, and a light-chain variable region comprising a light-chain CDR1 of SEQ ID NO: 28, a light-chain CDR2 of SEQ ID NO: 29, and a light-chain CDR3 of SEQ ID NO: 30; or
a heavy-chain variable region comprising a heavy-chain CDR1 of SEQ ID NO: 31, a heavy-chain CDR2 of SEQ ID NO: 32 and a heavy-chain CDR3 of SEQ ID NO: 33, and a light-chain variable region comprising a light-chain CDR1 of SEQ ID NO: 34, a light-chain CDR2 of SEQ ID NO: 35, and a light-chain CDR3 of SEQ ID NO: 36.

2. The antibody or an antigen-binding fragment thereof according to claim 1, wherein the antibody or an antigen-binding fragment thereof comprises a heavy-chain variable region selected from the group consisting of SEQ ID NOS: 38, 42, 46, 50, 54 and 58.

3. The antibody or an antigen-binding fragment thereof according to claim 1, wherein the antibody or an antigen-binding fragment thereof comprises a light-chain variable region selected from the group consisting of SEQ ID NOS: 40, 44, 48, 52, 56 and 60.

4. A nucleic acid encoding the antibody or an antigen-binding fragment thereof according to claim 1.

5. The nucleic acid according to claim 4, wherein the nucleic acid encoding the heavy-chain variable region is selected from the group consisting of SEQ ID NOS: 37, 41, 45, 49, 53 and 57.

6. The nucleic acid according to claim 4, wherein the nucleic acid encoding the light-chain variable region is selected from the group consisting of SEQ ID NOS: 39, 43, 47, 51, 55 and 59.

7. An expression vector comprising the nucleic acid according to claim 4.

8. A cell transformed with the expression vector according to claim 7.

9. A method of producing an antibody binding to TIE2 or antigen-binding fragment thereof comprising:
(a) culturing the cell according to claim 8; and
(b) recovering an antibody or antigen-binding fragment thereof from the cultured cell.

10. A composition comprising the antibody or an antigen-binding fragment thereof according to claim 1 as an active ingredient for preventing or treating an angiogenesis-related disease.

11. The composition according to claim 10, wherein the angiogenesis-related disease is selected from the group consisting of tumor, cancer, metastasis of tumor or cancer, diabetic retinopathy, retinopathy of prematurity, corneal graft rejection, macular degeneration, neovascular glaucoma, erythrosis, proliferative retinopathy, psoriasis, hemophilic arthritis, capillary formation of atherosclerotic plaques, keloid, wound granulation, vascular adhesion, rheumatoid arthritis, osteoarthritis, autoimmune diseases, Crohn's disease, restenosis, atherosclerosis, intestinal adhesions, cat scratch disease, ulcers, diabetic foot ulcers, liver cirrhosis, nephritis, diabetic nephropathy, chronic renal failure, diabetes mellitus, inflammatory diseases, idiopathic pulmonary fibrosis, sepsis, acute respiratory distress syndrome, and neurodegenerative diseases.

12. A composition comprising the antibody or an antigen-binding fragment thereof according to claim 1 as an active ingredient for stabilization of a blood vessel.

13. A composition comprising the antibody or an antigen-binding fragment thereof according to claim 1 as an active ingredient for diagnosing an angiogenesis-related disease.

14. A composition comprising the antibody or an antigen-binding fragment thereof according to claim 1 as an active ingredient for preventing or treating a tumor or a cancer.

15. A composition comprising the antibody or an antigen-binding fragment thereof according to claim 1 as an active ingredient for combined administration with other therapeutic drugs.

* * * * *

UNITED STATES PATENT AND TRADEMARK OFFICE
CERTIFICATE OF CORRECTION

PATENT NO. : 12,473,366 B2
APPLICATION NO. : 17/607872
DATED : November 18, 2025
INVENTOR(S) : Eun-Ah Lee et al.

It is certified that error appears in the above-identified patent and that said Letters Patent is hereby corrected as shown below:

In the Specification

Column 15, Line 47, "R-galactosidase" should be -- β-galactosidase --.

Column 16, Line 4, "1125" should be -- I125 --.

Column 16, Line 43, "1xPBS" should be -- 1XPBS --.

Column 17, Line 51, "Kan. 70 μg/ml, +1 mM IPTG" should be -- Kan. 70 μg/ml +1 mM IPTG --.

Column 28, Line 38, "10x" should be -- 10X --.

Column 29, Line 39, "C02" should be -- $CO_2$ --.

Column 32, Line 27, "40 pg/eye" should be -- 40 μg/eye --.

Column 32, Line 27, "20 pg/eye" should be -- 20 μg/eye --.

Signed and Sealed this
Twenty-seventh Day of January, 2026

John A. Squires
*Director of the United States Patent and Trademark Office*